n(12) United States Patent
Deng et al.

(10) Patent No.: US 11,429,659 B2
(45) Date of Patent: Aug. 30, 2022

(54) CONTENT PUBLISHING METHOD AND APPARATUS AND READABLE STORAGE MEDIUM

(71) Applicant: TENCENT TECHNOLOGY (SHENZHEN) COMPANY LIMITED, Shenzhen (CN)

(72) Inventors: Yixin Deng, Shenzhen (CN); Xin Hu, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 329 days.

(21) Appl. No.: 16/891,007

(22) Filed: Jun. 2, 2020

(65) Prior Publication Data

US 2020/0293569 A1    Sep. 17, 2020

Related U.S. Application Data

(63) Continuation of application No. PCT/CN2019/073900, filed on Jan. 30, 2019.

(30) Foreign Application Priority Data

Feb. 6, 2018    (CN) .......................... 201810117665.9

(51) Int. Cl.
*G06F 3/048* (2013.01)
*G06F 16/487* (2019.01)
(Continued)

(52) U.S. Cl.
CPC ............. *G06F 16/487* (2019.01); *G06N 3/08* (2013.01); *H04L 65/4025* (2022.05);
(Continued)

(58) Field of Classification Search
CPC ....... G06F 3/0488; G06F 16/487; G06N 3/08; H04L 67/60; H04L 65/4025; H04L 67/52
See application file for complete search history.

(56) References Cited

U.S. PATENT DOCUMENTS 10,380,249 B2 * 8/2019  Tiwari ................... G06F 40/30
2014/0156769 A1   6/2014  Wan et al.
(Continued)

FOREIGN PATENT DOCUMENTS

CN       102387463 A       3/2012
CN       102667763 A       9/2012
(Continued)

OTHER PUBLICATIONS

The Japan Patent Office (JPO) Notification of Reasons for Refusal for Application No. 2020-541526 and Translation dated Aug. 30, 2021 6 Pages.
(Continued)

*Primary Examiner* — Rashawn N Tillery
(74) *Attorney, Agent, or Firm* — Anova Law Group, PLLC

(57) ABSTRACT

A content publishing method includes: obtaining a multimedia material and geographical location information; uploading the multimedia material and the geographical location information to a server; presenting a first output result and a second output result transmitted by the server in a user interface; and generating user content that includes the first output result and the second output result. The first output result is obtained by inputting a multimedia material into an AI model, and the second output result is obtained by combining the first output result with geographical location information.

20 Claims, 14 Drawing Sheets

(51) Int. Cl.
*G06N 3/08* (2006.01)
*H04L 65/402* (2022.01)
*H04L 67/52* (2022.01)
*H04L 67/60* (2022.01)
*G06F 3/0488* (2022.01)

(52) U.S. Cl.
CPC .............. *H04L 67/52* (2022.05); *H04L 67/60* (2022.05); *G06F 3/0488* (2013.01)

(56) References Cited

U.S. PATENT DOCUMENTS

| | | | |
|---|---|---|---|
| 2014/0172881 A1 | 6/2014 | Petrou et al. | |
| 2015/0264094 A1* | 9/2015 | Huang | H04L 51/52 709/204 |
| 2016/0328401 A1 | 11/2016 | Dhawan et al. | |
| 2017/0177623 A1 | 6/2017 | Chen et al. | |
| 2020/0162331 A1* | 5/2020 | Harpur | H04L 41/145 |
| 2020/0219323 A1* | 7/2020 | Varshney | H04L 51/52 |
| 2020/0273013 A1* | 8/2020 | Garner | G06Q 10/087 |
| 2021/0243149 A1* | 8/2021 | Schneider | H04L 51/222 |
| 2021/0319073 A1* | 10/2021 | Li | H04L 67/535 |

FOREIGN PATENT DOCUMENTS

| | | |
|---|---|---|
| CN | 103258022 A | 8/2013 |
| CN | 103853801 A | 6/2014 |
| CN | 106384058 A | 2/2017 |
| CN | 106503062 A | 3/2017 |
| CN | 108270794 A | 7/2018 |
| JP | 2017111782 A | 6/2017 |

OTHER PUBLICATIONS

Tomoya Shinji et al., "Prototyping and evaluation of the twitter client that assumes the tweet by voice input and an investigation on the use of utterance features," Information Processing Society of Japan Research Report 2012 (2012) 6 [CD-ROM], Japan, General Incorporated Information Processing Society, Feb. 15, 2013, pp. 1-8. 9 Pages.
The World Intellectual Property Organization (WIPO) International Search Report for PCT/CN2019/073900 dated Apr. 4, 2019 6 Pages (including translation).
The State Intellectual Property Office of the People's Republic of China (SIPO) Office Action 1 for 201810117665.9 dated Apr. 13, 2020 8 Pages (including translation).

* cited by examiner

CONTENT PUBLISHING METHOD AND APPARATUS AND READABLE STORAGE MEDIUM

CROSS-REFERENCES TO RELATED APPLICATIONS

This application is a continuation application of PCT Patent Application No. PCT/CN2019/073900, filed on Jan. 30, 2019, which claims priority to Chinese Patent Application No. 201810117665.9, filed on Feb. 6, 2018 and entitled "CONTENT PUBLISHING METHOD AND APPARATUS AND READABLE MEDIUM", both of which are incorporated herein by reference in their entirety.

FIELD OF THE TECHNOLOGY

The present disclosure relates to the field of artificial intelligence (AI), and in particular, to a content publishing method and apparatus and a readable storage medium.

BACKGROUND OF THE DISCLOSURE

An online community is a platform allowing users to interact with each other. A user may post user generated content (UGC) in the online community. The UGC includes text content generated by the user through editing, an image locally uploaded by the user, a voice recorded by the user by using a voice recording function, and the like. Other users may view the UGC and perform interaction.

The user may post a variety of content in the online community. The user may post a text, an image, a video, a voice, and the like in the online community. For example, a first user edits a text, adds a local image in a mobile phone of the user, combines the text and the image into one piece of UGC, and posts the UGC in the online community. Other users may see the UGC, that is, the text and the image, posted by the first user in the online community, and may comment on, repost or like the UGC or perform other forms of interaction.

However, the image in the UGC presented by the user in the online community can only be uploaded by the user, leading to unvaried forms.

SUMMARY

Embodiments of the present disclosure provide a content publishing method and apparatus and a readable storage medium, so that a problem that users present unvaried forms of content in an online community can be solved. The technical solutions are as follows:

According to one aspect, an embodiment of the present disclosure provides a content publishing method, applied to a terminal, and including: obtaining a multimedia material and geographical location information; uploading the multimedia material and the geographical location information to a server; presenting a first output result and a second output result transmitted by the server in a user interface; and generating user content that includes the first output result and the second output result. The first output result is obtained by inputting a multimedia material into an AI model, and the second output result is obtained by combining the first output result with geographical location information.

According to another aspect, an embodiment of the present disclosure provides a content publishing method, including: receiving a multimedia material and geographical location information uploaded by a terminal; inputting the multimedia material into an AI model, to obtain a first output result; combining the first output result with the geographical location information, to obtain a second output result; transmitting the first output result and the second output result to the terminal; and receiving user content transmitted by the terminal through an online community platform, the user content including the first output result and the second output result.

According to another aspect, an embodiment of the present disclosure provides a computer device, including a processor and a memory, the memory storing at least one instruction, at least one program, and a code set or an instruction set, and the at least one instruction, the at least one program, and the code set or the instruction set being loaded and executed by the processor to implement: obtaining a multimedia material and geographical location information; uploading the multimedia material and the geographical location information to a server; presenting a first output result and a second output result transmitted by the server in a user interface; and generating user content that includes the first output result and the second output result. The first output result is obtained by inputting a multimedia material into an AI model, and the second output result is obtained by combining the first output result with geographical location information.

According to another aspect, an embodiment of the present disclosure provides a computer-readable storage medium, storing at least one instruction, at least one program, and a code set or an instruction set, and the at least one instruction, the at least one program, and the code set or the instruction set being loaded and executed by a processor to implement: obtaining a multimedia material and geographical location information; uploading the multimedia material and the geographical location information to a server; presenting a first output result and a second output result transmitted by the server in a user interface; and generating user content that includes the first output result and the second output result. The first output result is obtained by inputting a multimedia material into an AI model, and the second output result is obtained by combining the first output result with geographical location information.

BRIEF DESCRIPTION OF THE DRAWINGS

To describe the technical solutions of the embodiments of the present disclosure more clearly, the following briefly introduces the accompanying drawings required for describing the embodiments. Apparently, the accompanying drawings in the following description show only some embodiments of the present disclosure, and a person of ordinary skill in the art may still derive other drawings from the accompanying drawings without creative efforts.

DESCRIPTION OF EMBODIMENTS

Figure 1:
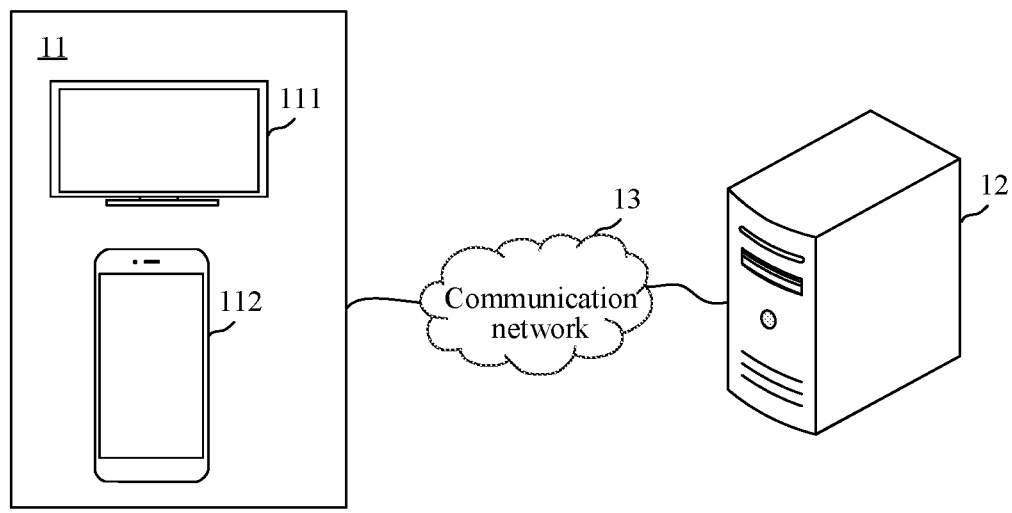
FIG. 1 is a schematic scenario diagram of an implementation environment according to an exemplary embodiment of the present disclosure.

To make the objectives, technical solutions, and advantages of the present disclosure clearer, the following further describes the implementations of the present disclosure in detail with reference to the accompanying drawings.

First, some terms used in the embodiments of the present disclosure are introduced.

An online community platform is a network platform provided for a user to publish content for presentation. Content published by the user in the network platform may be viewed by other users. Optionally, the published content may be user created content (also referred to as UGC), content reposted by the user, or the like. In the embodiments of the present disclosure, UGC is mainly described.

Optionally, one community includes several circles corresponding to different topics. Users may discuss one topic in one circle.

User content is content that is generated on a terminal and is to be published on an online community platform. Optionally, the user content includes at least one material such as an image, a video, a text, an audio, and an expression. The user content may further be classified into UGC and non-original content. The UGC is content generated by a user in a manner such as editing, photographing, recording, and uploading a local image on the terminal. The non-original content is content generated by the user in a manner such as repost, download, and copy and paste. In the embodiments of the present disclosure, the UGC of the user is mainly described.

An AI model is a machine learning model that recognizes and processes content such as an image, a voice, and a text by using AI. Optionally, the AI model may be formed by one or more neural networks.

Optionally, the AI model includes, but is not limited to, at least one of a deep neural network (DNN) model, a recurrent neural network (RNN) model, an embedding model, a gradient boosting decision tree (GBDT) model, a logistic regression (LR) model.

The DNN model is a deep learning framework. The DNN model includes an input layer, at least one hidden layer (or referred to as a middle layer), and an output layer. Optionally, each of the input layer, the at least one hidden layer (or referred to as the middle layer), and the output layer includes at least one neuron, and the neuron is used for processing received data. Optionally, different layers may have the same quantity of neurons or may have different quantities of neurons.

The RNN model is a neural network having a feedback structure. In the RNN model, an output of a neuron may directly act on the neuron itself at a next time stamp. That is, an input of an $i^{th}$ layer neuron at a moment m includes both an output of an $(i-1)^{th}$ layer neuron at the moment and an output of the $i^{th}$-layer neuron at a moment m-1.

In the embedding model, based on a distributed vector representation of an entity and a relation, a relation in each triplet instance is considered as a translation from an entity head to an entity tail. The triplet instance includes a subject, a relation, and an object. The triplet instance may be represented as (subject, relation, object). The subject is an entity head, and the object is an entity tail. For example, Smith Senior is Smith Junior's father, and a triplet instance is represented as (Smith Junior, Father, Smith Senior).

The GBDT model is an iterative decision tree algorithm. The algorithm is formed by a plurality of decision trees. Results of all the trees are added to form an eventual result. Each node of a decision tree obtains a predicted value. Age is used as an example. The predicted value is an average age value of all the people that belong to a node corresponding to age.

The LR model is a model established by using a logic function based on linear regression.

FIG. 1 is a schematic scenario diagram of an implementation environment according to an exemplary embodiment of the present disclosure. As shown in FIG. 1, the implementation environment includes a terminal 11, a server 12, and a communication network 13.

The terminal 11 is used for accessing an online community platform. The online community platform is a platform that allows sharing of user content. The user content at least includes UGC and non-original content. Optionally, a client providing an online community platform service is run on the terminal 11. The client may be a browser application, an instant messaging application, an audio and video application, a game application, an asset management application, a payment application, or the like. Optionally, the terminal 11 may be a mobile phone, a tablet computer, a portable laptop computer, a desktop computer, or the like. As shown in FIG. 1, the terminal 11 includes a terminal 111 and a terminal 112. In some embodiments of the present disclosure, an example in which the terminal 11 includes two terminals is used for description. In an actual operation, the terminal 11 may include more or fewer terminals.

The server 12 stores an AI model. The AI model is used for inputting a multimedia material and outputting a first output result. The multimedia material is a material generated by the terminal through editing or upload on the online community platform. For example, an image material is inputted into the AI model, to obtain an image recognition result. An audio material is inputted into the AI model, to obtain a modified audio. Optionally, the server 12 may be one server or may be a server cluster formed by a plurality of servers. The server 12 may be a physical server or may be a cloud server. A specific form of the server 12 is not limited in the present disclosure.

The terminal 11 communicates with the server 12 by using the communication network 13. The communication network 13 may be a wired network or may be a wireless network.

Figure 2:
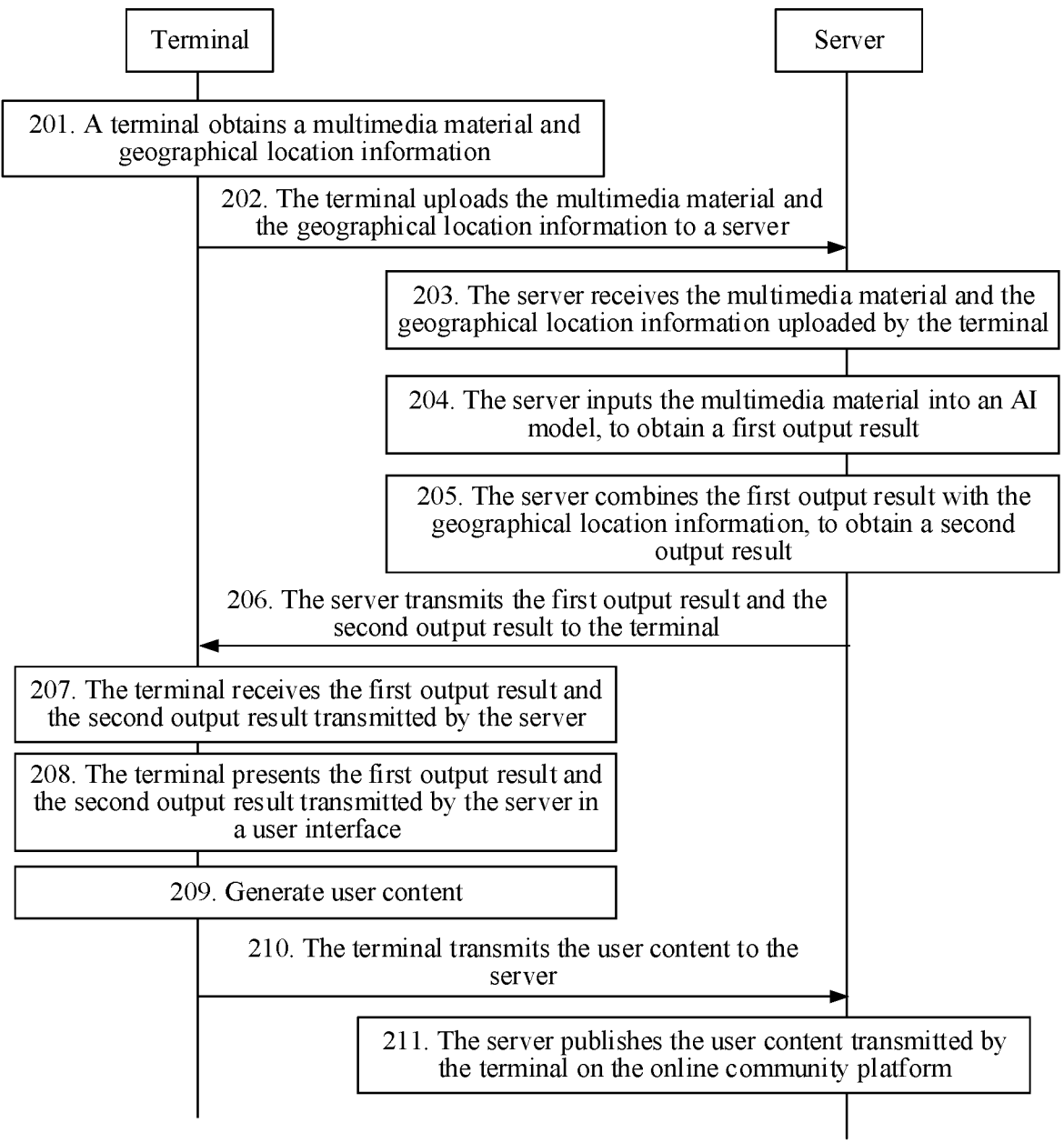
FIG. 2 is a flowchart of a content publishing method according to an exemplary embodiment of the present disclosure.

FIG. 2 is a flowchart of a content publishing method according to an exemplary embodiment of the present disclosure. An example in which the method is applied to the implementation environment shown in FIG. 1 is used for description, and the content publishing method includes the following steps:

Step 201. A terminal obtains a multimedia material and geographical location information.

Optionally, the multimedia material is a material obtained by the terminal through editing, download, upload, photographing, or recording. Optionally, when the multimedia material is a material obtained by the terminal through editing, photographing, or recording, the multimedia material may further be referred to as a non-original material. For example, the terminal may generate a text through editing as a multimedia material, or upload one image as a multimedia material, or generate an audio through recording as a multimedia material. Optionally, the multimedia material includes at least one of an image material, an audio material, a text material, or a video material.

Optionally, the geographical location information is information obtained by the terminal in a satellite positioning manner, and may be information obtained by the terminal in a mobile base station positioning manner, information obtained by the terminal in a wireless network assisted positioning manner, or information obtained by the terminal by using an assisted global positioning system (AGPS). This is not limited in this embodiment of the present disclosure.

Step 202. The terminal uploads the multimedia material and the geographical location information to a server.

Optionally, the terminal may first obtain and transmit the multimedia material, and then obtain and transmit the geographical location information; or obtain and transmit the geographical location information, and then obtain and transmit the multimedia material; or simultaneously obtain and transmit the multimedia material and the geographical location information.

Step 203. The server receives the multimedia material and the geographical location information uploaded by the terminal.

Step 204. The server inputs the multimedia material into an AI model, to obtain a first output result.

Optionally, the server inputs the received multimedia material into the AI model, to obtain the first output result. Optionally, the first output result is multimedia data that is obtained after the server performs AI processing on the multimedia material by using the AI model and is added with processing result content.

Optionally, the first output result may be an image recognition result obtained after image recognition is performed on the image material, a modification result obtained after the audio material is modified, or an audio recognition result obtained after audio recognition is performed on the audio material.

Step 205. The server combines the first output result with the geographical location information, to obtain a second output result.

Optionally, a manner of combining the first output result with the geographical location information includes at least one of the following manners: 1. Content corresponding to the first output result is displayed at a location point corresponding to the geographical location information on a map. 2. A geographical area corresponding to the geographical location information is obtained, an output result set corresponding to a type of the first output result in the geographical area is determined, and a second output result is determined according to an arrangement order in the output result set. Optionally, the output result set includes at least one output result outputted by using an AI model. Optionally, the output result set includes a plurality of output results outputted by using one same AI model. Optionally, the output result set may further include a plurality of output results outputted by using different AI models. For example, the output result set includes face similarity results with a public figure a that are outputted by using a face processing model. The output result set further includes sound similarity results with a public figure a that are outputted by using a sound processing model. After the face similarity results and the sound similarity results are arranged in combination, an arrangement order in the output result set is obtained.

Step 206. The server transmits the first output result and the second output result to the terminal.

Step 207. The terminal receives the first output result and the second output result transmitted by the server.

Optionally, the first output result is obtained after the server inputs the multimedia material into the AI model, and the second output result is obtained by the server by combining the first output result with the geographical location information.

Step 208. The terminal presents the first output result and the second output result transmitted by the server in a user interface.

Optionally, the terminal may present the first output result and the second output result transmitted by the server in an edit user interface. The edit user interface includes a text edit box, the first output result, the second output result, and a post control. A user may edit a text in the text edit box. The terminal may further present the first output result and the second output result transmitted by the server in a presentation user interface. The presentation user interface includes the first output result, the second output result, and a share control.

Step 209. Generate user content.

Optionally, the user content includes the first output result and the second output result. Optionally, the user content is used for being published on an online community platform.

Optionally, when the terminal presents the first output result and the second output result in the edit user interface, text content edited by the user, the first output result, and the second output result are the user content. Optionally, the user content may further include other content edited, downloaded, uploaded, photographed, or recorded by the user. Optionally, when the terminal displays the first output result and the second output result in the presentation user interface, and the user triggers the share control, the terminal displays the edit user interface, so that the text content edited by the user in the edit user interface, the first output result, and the second output result are the user content. Optionally, the user content may further include other content edited, downloaded, uploaded, photographed, or recorded by the user.

Step 210. The terminal transmits the user content to the server.

Optionally, when the terminal presents the first output result and the second output result in the edit user interface, and the user triggers the post control (e.g., by performing a touch operation), the terminal transmits the user content to the server. When the terminal displays the first output result and the second output result in the presentation user interface, and the user triggers the share control, the terminal displays the edit user interface. The edit user interface includes the post control, so that the user may transmit the user content to the server by triggering the post control.

Step 211. The server publishes the user content transmitted by the terminal on the online community platform.

Optionally, after the server publishes the user content on the online community platform, the terminal or other terminals may view the user content on the online community platform.

In conclusion, in the content publishing method provided in some embodiments, a first output result is obtained by inputting a multimedia material into an AI model, a second output result is obtained by combining the first output result with geographical location information, and content is generated according to the first output result and the second output result and is posted on an online community platform, so that a user publishes UGC on the online community platform in more varied forms, and the interactivity of the online community platform is improved. Moreover, the tonality of the online community platform is improved. That is, a requirement that content published by the user in a circle on the online community platform better satisfies a corresponding topic in this circle is satisfied, and a problem that excessively unvaried content is published on the online community platform is avoided.

In an optional embodiment, the second output result is determined according to an arrangement order of the first output result in a same-type output result set.

Figure 3:
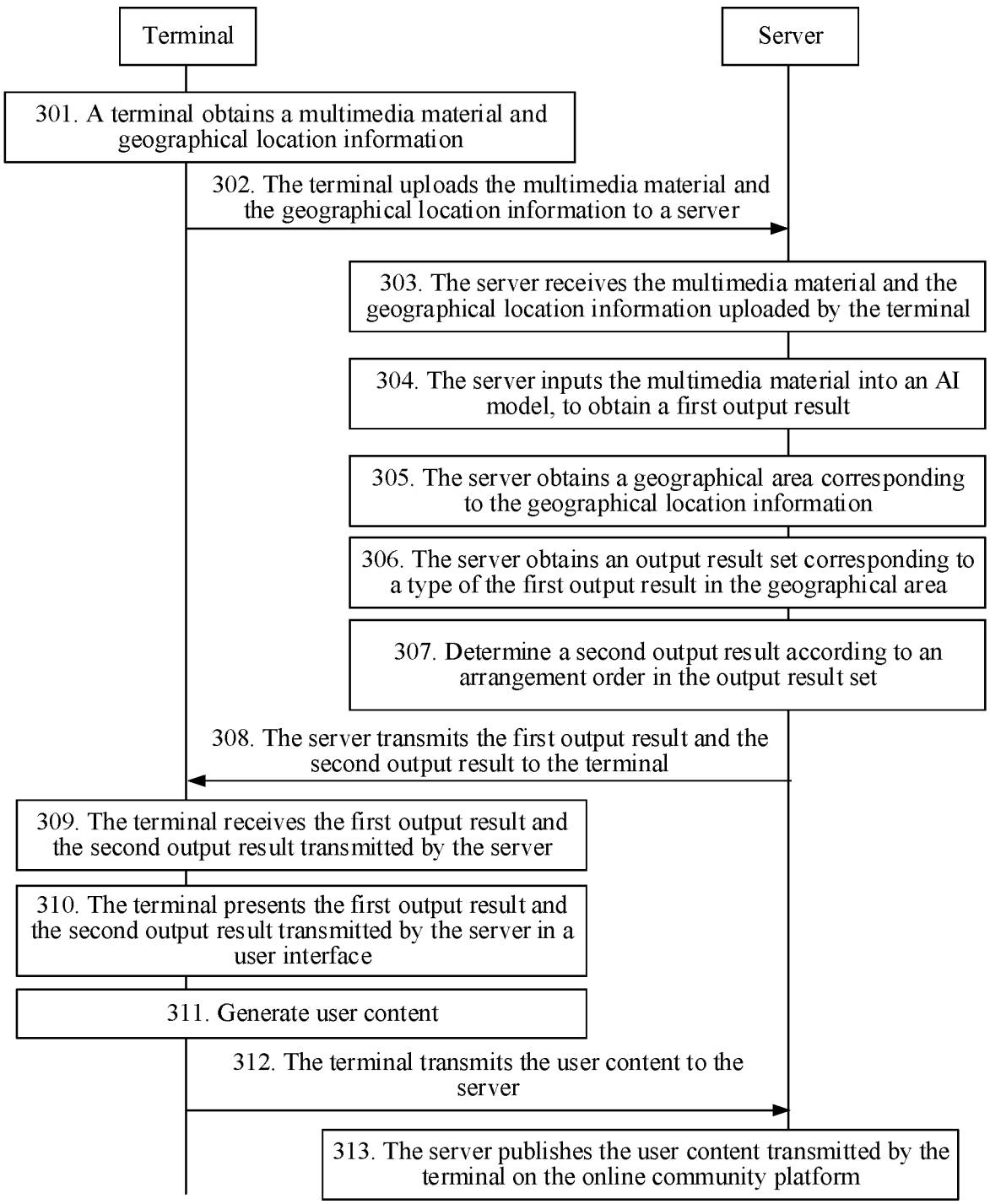
FIG. 3 is a flowchart of a content publishing method according to another exemplary embodiment of the present disclosure.

FIG. 3 is a flowchart of a content publishing method according to another exemplary embodiment of the present disclosure. An example in which the method is applied to the implementation environment shown in FIG. 1 is used for description, and the content publishing method includes the following steps:

Step 301. A terminal obtains a multimedia material and geographical location information.

Step 302. The terminal uploads the multimedia material and the geographical location information to a server.

Optionally, when the multimedia material is an image material, a user may select an image material that the user wants to upload from a local album of the terminal, and tap an upload control to upload the image material. The user may alternatively photograph an image material by using a camera of the terminal, and tap the upload control to upload the image material after the image material is obtained through photographing. When the multimedia material is an audio material, the user may select an audio material that the user wants to upload from a local recording library of the terminal, and tap the upload control to upload the audio material. The user may alternatively record an audio material by using a microphone of the terminal, and tap the upload control to upload the audio material after the audio material is obtained through recording.

Step 303. The server receives the multimedia material and the geographical location information uploaded by the terminal.

Step 304. The server inputs the multimedia material into an AI model, to obtain a first output result.

Optionally, the server inputs the received multimedia material into the AI model, to obtain the first output result. The first output result may be an image recognition result obtained after image recognition is performed on the image material, a modification result obtained after the audio material is modified, or an audio recognition result obtained after audio recognition is performed on the audio material.

Step 305. The server obtains a geographical area corresponding to the geographical location information.

Optionally, the geographical location information corresponds to one geographical area. The geographical area includes a location point corresponding to the geographical location information. The geographical area is a preset geographical area. That is, a plurality of geographical areas are obtained through division on a map. The geographical area of the geographical location information on the map is determined according to the geographical location information. For example, a geographical area "Nanshan district" includes a location point A. When geographical location information obtained by the server is geographical location information of the location point A, the server obtains the geographical area "Nanshan district" corresponding to the location point A.

Step 306. The server obtains an output result set corresponding to a type of the first output result in the geographical area.

Optionally, the output result set includes at least one output result outputted by an AI model, and the AI model is the AI model corresponding to the first output result. That is, the output result set includes at least one output result outputted by using one same AI model.

Step 307. Determine a second output result according to an arrangement order in the output result set.

Optionally, the second output result includes a ranking of the first output result in a same-type output result set.

Step 308. The server transmits the first output result and the second output result to the terminal.

Step 309. The terminal receives the first output result and the second output result transmitted by the server.

Optionally, the first output result is obtained after the server inputs the multimedia material into the AI model, and the second output result is obtained by the server by combining the first output result with the geographical location information.

Step 310. The terminal presents the first output result and the second output result transmitted by the server in a user interface.

Optionally, the terminal may present the first output result and the second output result transmitted by the server in an edit user interface. The edit user interface includes a text edit box, the first output result, the second output result, and a post control. A user may edit a text in the text edit box. The terminal may further present the first output result and the second output result transmitted by the server in a presentation user interface. The presentation user interface includes the first output result, the second output result, and a share control.

Step 311. Generate user content.

Optionally, the user content includes the first output result and the second output result. Optionally, the user content is used for being published on an online community platform.

Step 312. The terminal transmits the user content to the server.

Optionally, when the terminal presents the first output result and the second output result in the edit user interface and the user triggers the post control, the terminal transmits the user content to the server. When the terminal displays the first output result and the second output result in the presentation user interface and the user triggers the share control, the terminal displays the edit user interface. The edit user interface includes the post control, so that the user may transmit the user content to the server by triggering the post control.

Step 313. The server publishes the user content transmitted by the terminal on the online community platform.

Optionally, after the server publishes the user content on the online community platform, the terminal or other terminals may view the user content on the online community platform.

In conclusion, in the content publishing method provided in some embodiments, a first output result is obtained by inputting a multimedia material into an AI model, a second output result is obtained by combining the first output result with geographical location information, and content is generated according to the first output result and the second output result and is posted on an online community platform, so that a user publishes UGC on the online community platform in more varied forms, and the interactivity of the online community platform is improved. When there are several circles including topics on the online community platform, the tonality of the online community platform is improved. The tonality is the correlation between content published in a circle and a topic. When the tonality of the online community platform is improved, a requirement that content published by the user in a circle on the online community platform better satisfies a corresponding topic in this circle is satisfied. In addition, a problem that excessively unvaried content is published on the online community platform is avoided.

In the content publishing method provided in some embodiments, a same-type output result set is obtained and according to an arrangement order of a first output result in the same-type output result set, a user may intuitively feel the fun level of the first output result and the second output result, and publish the first output result and the second output result on the online community platform.

In an optional embodiment, the multimedia material may be an image material or may be an audio material.

Figure 4:
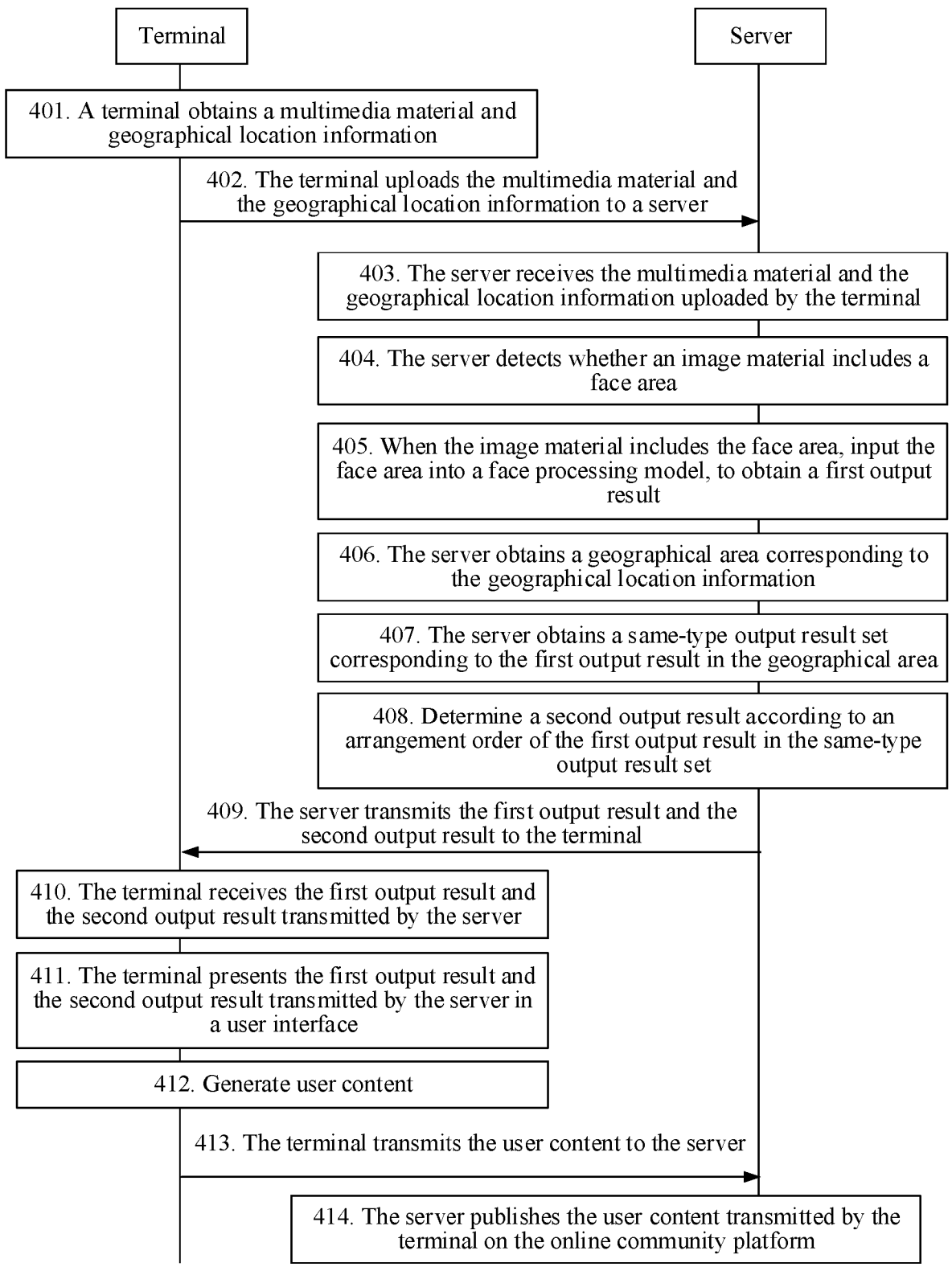
FIG. 4 is a flowchart of a content publishing method according to another exemplary embodiment of the present disclosure.

First, an example in which the multimedia material is an image material is described. FIG. 4 is a flowchart of a content publishing method according to another exemplary embodiment of the present disclosure. An example in which the method is applied to the implementation environment shown in FIG. 1 is used for description, and the content publishing method includes the following steps:

Step 401. Obtain a multimedia material and geographical location information.

Optionally, the multimedia material is a material obtained by a terminal through editing, upload, or recording. In some embodiments, an example in which the multimedia material is an image material is used for description.

Optionally, the geographical location information is information obtained by the terminal in a satellite positioning manner, and may be information obtained by the terminal in a mobile base station positioning manner, information obtained by the terminal in a wireless network assisted positioning manner, or information obtained by the terminal by using an AGPS. This is not limited in this embodiment of the present disclosure.

Step 402. Upload the multimedia material and the geographical location information to a server.

Optionally, when the multimedia material is an image material, a user may select an image material that the user wants to upload from a local album of the terminal, and tap an upload control to upload the image material. The user may alternatively photograph an image material by using a camera of the terminal, and tap the upload control to upload the image material after the image material is obtained through photographing.

Figure 5:
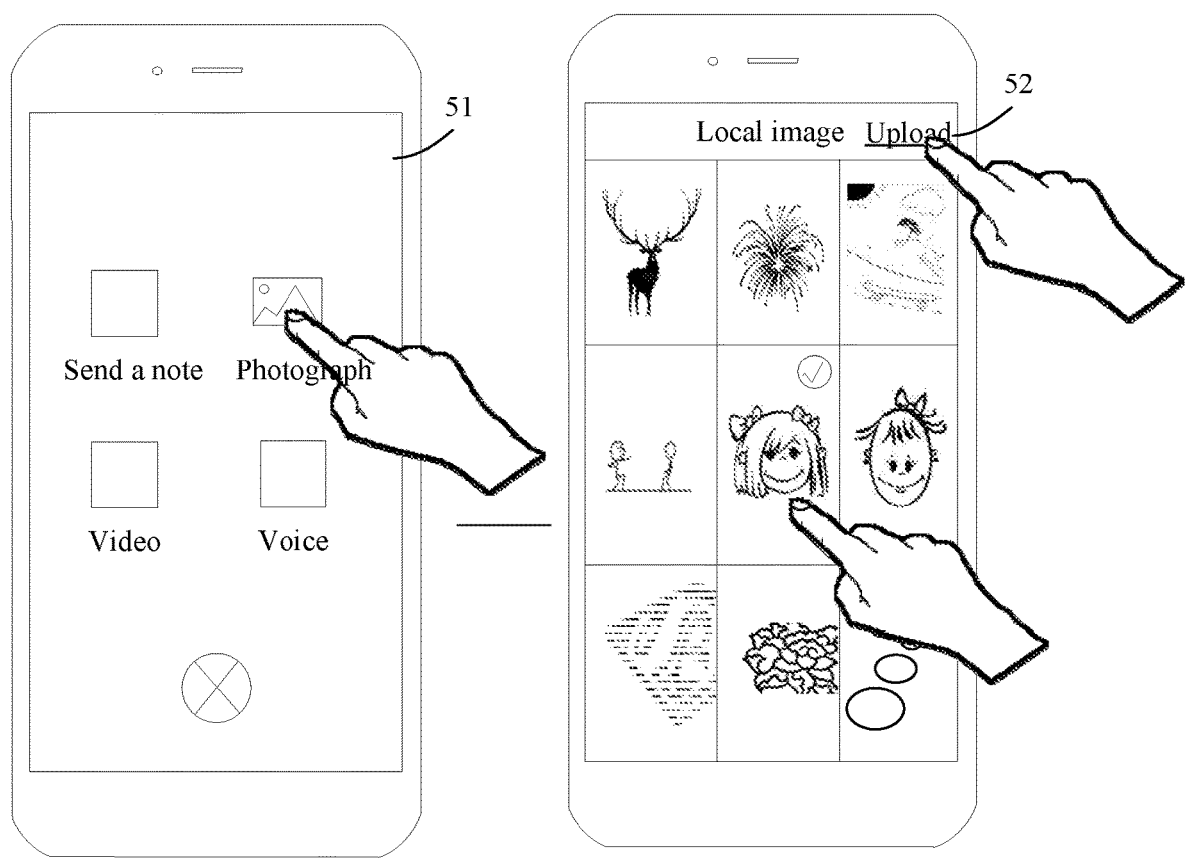
FIG. 5 is a flowchart of the content publishing method according to the embodiment shown in FIG. 4.

For example, as shown in FIG. 5, in a user interface 51, the user selects a "photograph" option to upload a photograph, and a user interface 52, that is, a user interface in which a local image is selected and uploaded, is displayed in the terminal. After the user selects an image material in the user interface 52 and uploads the image material, the terminal transmits the selected image material and geographical location information to the server.

Step 403. The server receives the multimedia material and the geographical location information uploaded by the terminal.

Step 404. The server detects whether an image material includes a face area.

After receiving the image material, the server detects whether the image material includes a face area.

Optionally, the server detects whether the image material includes a face area by invoking a face recognition technology. For example, the following provides four face recognition methods that may be used for detecting whether the image material includes the face area:

First, in a reference template method, one or more face templates are pre-stored in a server, a part of region or an entire region in an image material is matched against with the face template, and it is determined whether the image material includes a face area according to an obtained matching degree.

Second, in a face rule method, because a face has specific structural distribution features, features are extracted from a face template, a corresponding rule is generated, and it is determined, according to the generated rule, whether an image material includes a face area.

Third, in a sample learning method, an image material is learned by using a neural network, image elements in the image material are classified, and it is determined whether the image material includes a face area.

Fourth, in a complexion simulation method, because a complexion is relatively densely distributed in a color space, and it is determined, according to a distribution rule of the complexion, whether an image material includes a face image.

Step 405. When the image material includes the face area, input the face area into a face processing model, to obtain a first output result.

Optionally, the face processing model is used for performing at least one of face similarity detection and face analysis on the face area. Optionally, the face processing model is further used for performing face recognition on the face area.

In the face similarity detection, a similarity between two or more face areas is detected.

In face feature analysis, a face feature is analyzed. The face feature includes at least one of gender, age, a mood, a charm value, whether there are glasses, whether there is jewelry, and whether there is a hat.

In face recognition, a face area is matched against a pre-stored face, to obtain face information corresponding to the pre-stored face. The face information includes at least one of a name, gender, a character, a charm value, an identity, and an occupation.

Step 406. The server obtains a geographical area corresponding to the geographical location information.

Step 407. The server obtains an output result set corresponding to a type of the first output result in the geographical area.

Step 408. Determine a second output result according to an arrangement order in the output result set.

Optionally, the second output result includes a ranking of the first output result in a same-type output result set.

Step 409. The server transmits the first output result and the second output result to the terminal.

Optionally, the first output result is obtained after the server inputs the multimedia material into the AI model, and the second output result is obtained by the server by combining the first output result with the geographical location information.

Step 410. The terminal receives the first output result and the second output result transmitted by the server.

Optionally, the first output result is obtained after the server inputs the multimedia material into the AI model, and the second output result is obtained by the server by combining the first output result with the geographical location information.

Optionally, the second output result includes ranking information of the first output result in the geographical area, where the ranking information is determined according to an arrangement order of the first output result, the first output result corresponding to a same-type output result set in the geographical area being obtained after the server obtains the geographical area corresponding to the geographical location information, the same-type output result set including at least one output result obtained after another multimedia material is inputted into the AI model.

Step 411. The terminal presents the first output result and the second output result transmitted by the server in a user interface.

Optionally, the terminal may present the first output result and the second output result transmitted by the server in an edit user interface. The edit user interface includes a text edit box, the first output result, the second output result, and a post control. A user may edit a text in the text edit box. The terminal may further present the first output result and the second output result transmitted by the server in a presentation user interface. The presentation user interface includes the first output result, the second output result, and a share control.

Figure 6:
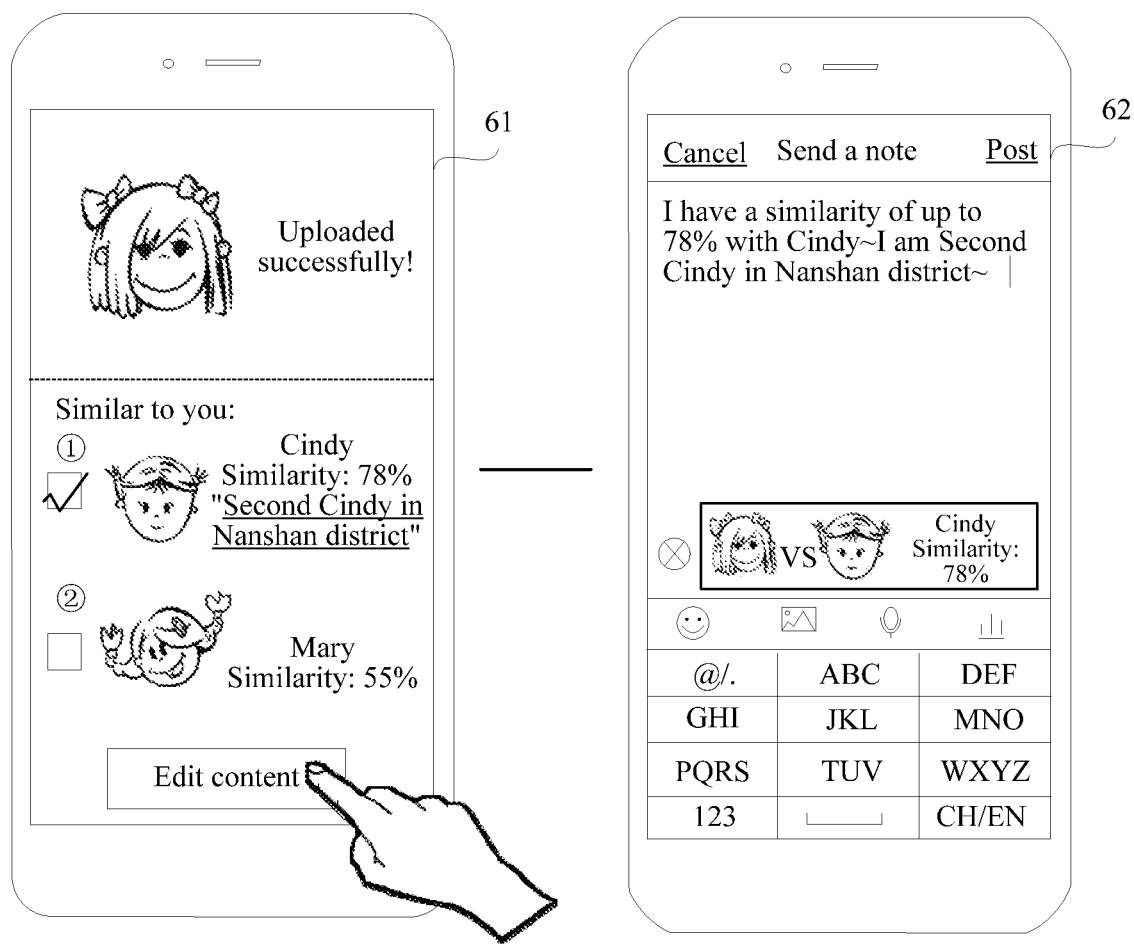
FIG. 6 is another flowchart of the content publishing method according to the embodiment shown in FIG. 4.

As shown in FIG. 6, after the terminal successfully uploads the image material and the geographical location information, the server returns a first output result and a second output result, and displays the first output result and the second output result in a user interface 61. The first output result is similarity "78%" between a face area in the image material uploaded by the user and a sample face "Cindy", and the second output result is "Second Cindy in Nanshan district". After selecting the first output result and the second output result, the user edits a text in a user interface 62, and generates user content.

Step 412. Generate user content.

Optionally, the user content includes the first output result and the second output result. Optionally, the user content is used for being published on an online community platform.

Step 413. The terminal transmits the user content to the server.

Step 414. The server publishes the user content transmitted by the terminal on the online community platform.

Optionally, after the server publishes the user content on the online community platform, the terminal or other terminals may view the user content on the online community platform.

In conclusion, in the content publishing method provided in some embodiments, a first output result is obtained by inputting a multimedia material into an AI model, a second output result is obtained by combining the first output result with geographical location information, and content is generated according to the first output result and the second output result and is posted on an online community platform, so that a user publishes UGC on the online community platform in more varied forms, and the interactivity of the online community platform is improved. Moreover, the tonality of the online community platform is improved. That is, a requirement that content published by the user in a circle on the online community platform better satisfies a corresponding topic in this circle is satisfied, and a problem that excessively unvaried content is published on the online community platform is avoided.

In the content publishing method provided in some embodiments, a face area in an image material is recognized, and the face area is input into a face processing model, and at least one of face similarity detection, face feature analysis, and face recognition may be performed on the image material, thereby increasing the fun level of UGC transmitted by a user on an online community platform.

Figure 7:
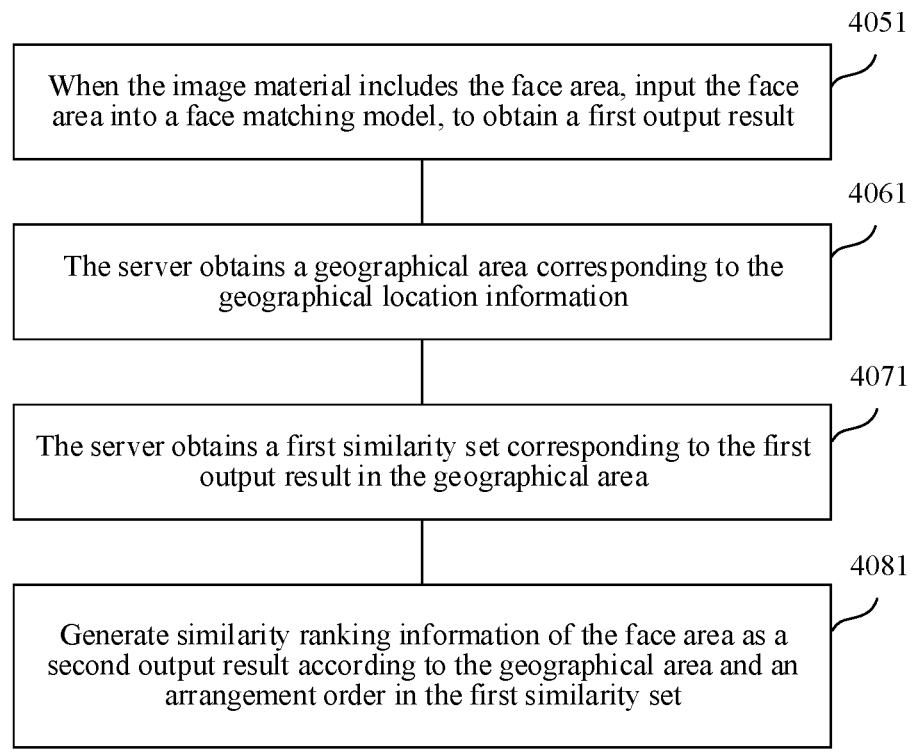
FIG. 7 is a schematic diagram of a user interface of a terminal according to another exemplary embodiment of the present disclosure.

In an optional embodiment, the face processing model is a face matching model. Referring to FIG. 7, step 4051 to step 4081 may be implemented in place of step 405 to step 408.

Step 4051. When the image material includes the face area, input the face area into a face matching model, to obtain a first output result.

Optionally, the first output result includes a first similarity between the face area and a sample face.

Optionally, the server may input the face area and a sample face into the face matching model. The face matching model may be formed by one or more neural networks. Features of the face area and the sample face are extracted and matched by using the one or more neural networks, to obtain a first similarity between the face area and the sample face.

The first output result includes the first similarity between the face area and the sample face. Optionally, the sample face is one or more of face images that are pre-stored in the server. That is, the first output result may include more than one first similarity. Optionally, the sample face may be a face image of a fairly famous person such as a movie star, a singer, a sports star, a model or a famous entrepreneur. Optionally, the sample face may be selected by the user. After the user selects the sample face, the server inputs the face area and the selected sample face into the face matching model, to obtain the first similarity.

For example, the first output result obtained for the face area includes: a first similarity between the face area and a sample face A being 78%, and a first similarity between the face area and a sample face B being 55%.

Optionally, the server may further arrange first similarities between the face area and sample faces in descending order. For example, if a first similarity between the face area and a sample face A is 78%, a first similarity between the face area and a sample face B is 55%, and a first similarity between the face area and a sample face C is 90%, a descending order of the first similarities between the face area and the sample faces is the sample face C (90%), the sample face A (78%), and the sample face B (55%).

Optionally, when the image material includes more than one face area, each of the more than one face area is inputted into the face matching model, and a first similarity corresponding to each face area is obtained. The obtained first similarities corresponding to the face areas may be similarities between the face areas and one same sample face or one group of sample faces or may be similarities between the face areas and different sample faces.

For example, when it is detected that the image material includes a face area a and a face area b, the first output result includes: a first similarity between the face area a and a sample face A being 80%, a first similarity between the face area a and a sample face B being 50%; and a first similarity between the face area b and the sample face A being 88%, and a first similarity between the face area b and the sample face B being 70%.

Step 4061. The server obtains a geographical area corresponding to the geographical location information.

Step 4071. Obtain a first similarity set corresponding to the first output result in the geographical area.

Optionally, the first similarity set includes a similarity between at least another face area and the sample face. The another face area is uploaded by a terminal located in the geographical area.

Optionally, face areas in the first similarity set may be sorted in descending order of first similarities.

For example, a similarity set corresponding to face areas uploaded by a terminal located in Nanshan district and a sample face "Cindy" is shown in the following Table 1:

TABLE 1

| Face area | Similarity with the sample face "Cindy" |
|---|---|
| Face area a | 89% |
| Face area b | 88% |
| Face area c | 75% |
| Face area d | 50% |

Step 4081. Generate similarity ranking information of the face area as a second output result according to the geographical area and an arrangement order in the first similarity set.

Optionally, the server may splice the name of the geographical area, an arrangement order of a first similarity in the first similarity set, and the name of the sample face, to obtain similarity ranking information.

For example, with reference to Table 1, an example in which the first similarity is a similarity between the face area b and the sample face "Cindy" is used. The similarity is 88% and ranks second in the similarity set, so that similarity ranking information of the face area b is "Second Cindy in Nanshan district".

In conclusion, in the content publishing method provided in some embodiments, face similarity detection is performed on a face area in an image material transmitted by a terminal, a similarity between the face area and a famous figure such as a star may be calculated, and a calculation result is transmitted to the terminal. The terminal may add the similarity to content and post the content, thereby increasing the fun level of UGC published on an online community platform.

Figure 8:
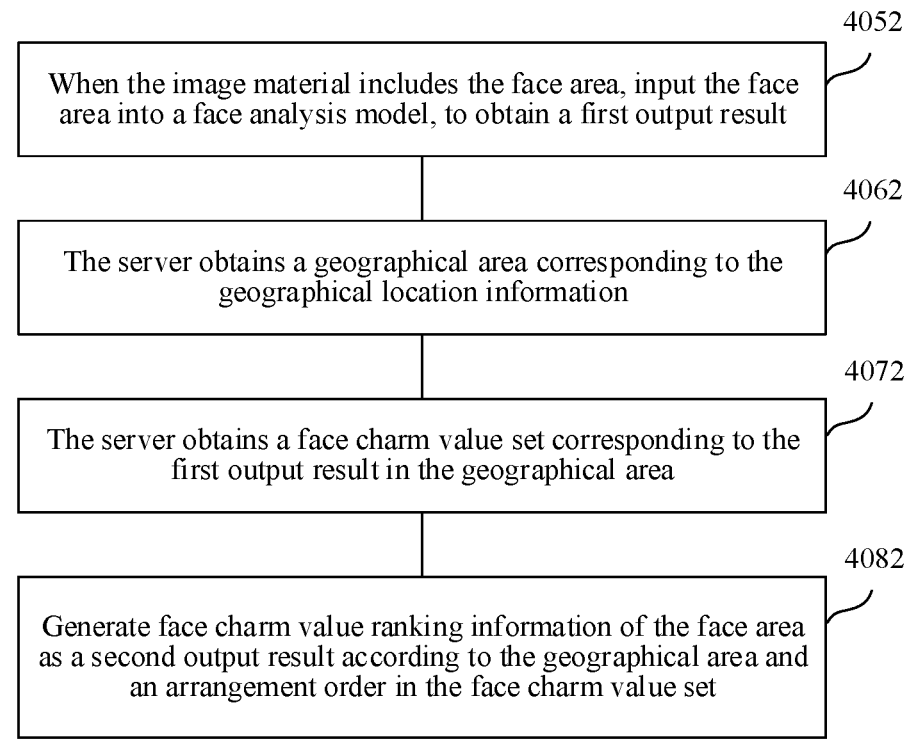
FIG. 8 is a schematic diagram of a user interface of a terminal according to another exemplary embodiment of the present disclosure.

In an optional embodiment, the face processing model is a face analysis model. Referring to FIG. 8, step 4052 to step 4082 may be implemented in place of step 405 to step 408.

Step 4052. When the image material includes the face area, input the face area into a face analysis model, to obtain a first output result.

Optionally, the first output result includes a face charm value.

Optionally, the face analysis model is used for analyzing a face feature of the face area. Optionally, the first output result includes at least one type of face feature of gender, age, a mood, a charm value, whether there are glasses, whether there is jewelry, and whether there is a hat of the face area.

Optionally, the face analysis model includes one or more neural networks. Feature extraction is performed on the face area by using the one or more neural networks, to obtain the foregoing at least one type of face feature of the face area.

Step 4062. The server obtains a geographical area corresponding to the geographical location information.

Step 4072. Obtain a face charm value set corresponding to the first output result in the geographical area.

Optionally, the charm value set includes a charm value of at least another face area. The another face area is uploaded by a terminal located in the geographical area.

Optionally, face areas in the face charm value set may be sorted in descending order of charm values.

For example, a charm value set of face areas uploaded by a terminal located in Nanshan district is shown in the following Table 2:

TABLE 2

| Face area | Charm value |
|---|---|
| Face area a | 89 |
| Face area b | 88 |
| Face area c | 75 |
| Face area d | 50 |

Step 4082. Generate face charm value ranking information of the face area as a second output result according to the geographical area and an arrangement order in the face charm value set.

Optionally, the server may splice the name of the geographical area, an arrangement order of a face charm value in the face charm value set, and gender information of the face area, to obtain face charm value ranking information.

Optionally, the server may further classify face areas in the charm value set according to gender obtained through recognition. For example, a first charm value set is obtained according to face areas with the gender being female, and a second charm value set is obtained according to face areas with the gender being male. Charm value ranking information of a face area is determined in the first charm value set or the second charm value set as a second output result according to the gender of the face area.

For example, with reference to Table 2. An example in which the first charm value set corresponding to face areas with the gender being female in Table 2 and a charm value of the face area b is used. The charm value is 88 and ranks second in the charm value set, so that face charm value ranking information of the face area b is "Second charming girl in Nanshan district".

In conclusion, in the content publishing method provided in some embodiments, face analysis is performed on a face area in an image material transmitted by a terminal, and charm value ranking information is transmitted to the terminal. The terminal may add the charm value ranking information to content, thereby increasing the fun level of the content published on an online community platform.

The content publishing methods shown in FIG. 7 and FIG. 8 may be simultaneously implemented, or may be independently implemented as an independent solution. This is not limited in this embodiment of the present disclosure.

Figure 9:
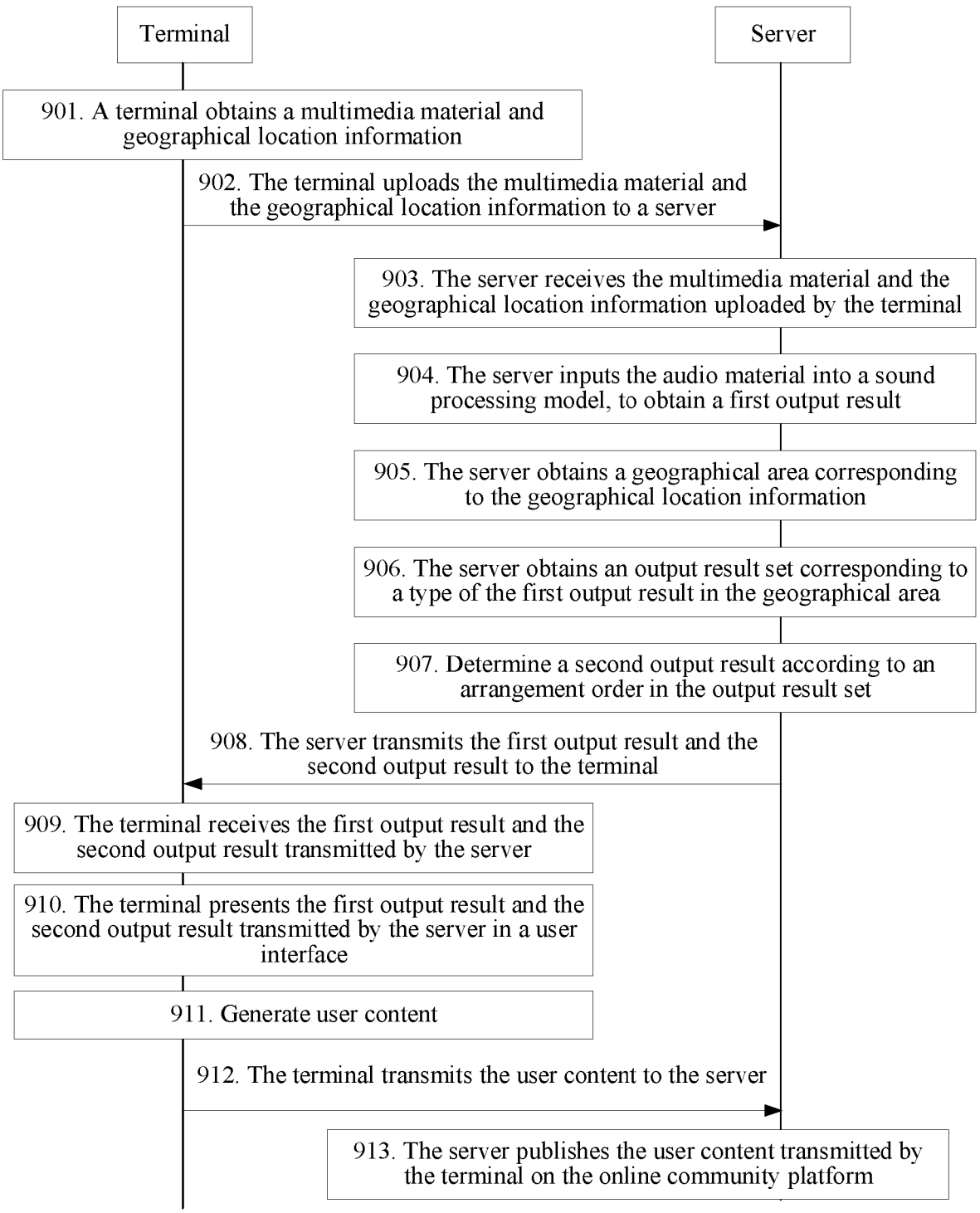
FIG. 9 is a flowchart of a content publishing method according to another exemplary embodiment of the present disclosure.

Second, that the multimedia material is an audio material is described. FIG. 9 is a flowchart of a content publishing method according to another exemplary embodiment of the present disclosure. An example in which the method is applied to the implementation environment shown in FIG. 1 is used for description, and the content publishing method includes the following steps:

Step 901. A terminal obtains a multimedia material and geographical location information.

Optionally, the multimedia material is a material obtained by the terminal through editing, upload, photographing, or recording. For example, the terminal generates, through recording, an audio as a multimedia material.

Optionally, the geographical location information is information obtained by the terminal in a satellite positioning manner, and may be information obtained by the terminal in a mobile base station positioning manner, information obtained by the terminal in a wireless network assisted positioning manner, or information obtained by the terminal by using an AGPS. This is not limited in this embodiment of the present disclosure.

Step 902. The terminal uploads the multimedia material and the geographical location information to a server.

Step 903. The server receives the multimedia material and the geographical location information uploaded by the terminal.

Optionally, the server may limit content uploaded by the terminal. For example, only an audio can be uploaded.

The terminal may record an audio on an online community platform and determine the recorded audio as an audio material for upload. The terminal may alternatively select a local audio and use the audio as an audio material for upload.

Step 904. The server inputs the audio material into a sound processing model, to obtain a first output result.

Optionally, the sound processing model may be determined according to a sound processing option transmitted by the terminal. For example, the terminal transmits the sound processing option to the server, and the server obtains the sound processing model corresponding to the sound processing option.

Step 905. The server obtains a geographical area corresponding to the geographical location information.

Step 906. The server obtains an output result set corresponding to a type of the first output result in the geographical area.

Optionally, the output result set includes at least one output result outputted by an AI model, and the AI model is the AI model corresponding to the first output result.

Step 907. Determine a second output result according to an arrangement order of the first output result in a same-type output result set.

Step 908. The server transmits the first output result and the second output result to the terminal.

Step 909. The terminal receives the first output result and the second output result transmitted by the server.

Optionally, the first output result is obtained after the server inputs the multimedia material into the AI model, and the second output result is obtained by the server by combining the first output result with the geographical location information.

Optionally, the first output result is obtained after the server inputs the audio material into the sound processing model. The sound processing model is used for performing at least one of modification, sound feature extraction, and sound similarity detection on the audio material.

Step 910. The terminal presents the first output result and the second output result transmitted by the server in a user interface.

Optionally, the terminal may present the first output result and the second output result transmitted by the server in an edit user interface. The edit user interface includes a text edit box, the first output result, the second output result, and a post control. A user may edit a text in the text edit box. The terminal may further present the first output result and the second output result transmitted by the server in a presentation user interface. The presentation user interface includes the first output result, the second output result, and a share control.

Step 911. Generate user content.

Optionally, the user content includes the first output result and the second output result. Optionally, the user content is used for being published on an online community platform.

Step 912. The terminal transmits the user content to the server.

Step 913. The server publishes the content transmitted by the terminal on the online community platform.

Optionally, after the server publishes the content on the online community platform, the terminal or other terminals may view the content on the online community platform.

In conclusion, in the content publishing method provided in some embodiments, a first output result is obtained by inputting a multimedia material into an AI model, a second output result is obtained by combining the first output result with geographical location information, and content is generated according to the first output result and the second output result and is posted on an online community platform, so that a user publishes UGC on the online community platform in more varied forms, and the interactivity of the online community platform is improved. Moreover, the tonality of the online community platform is improved. That is, a requirement that content published by the user in a circle on the online community platform better satisfies a corresponding topic in this circle is satisfied, and a problem that excessively unvaried content is published on the online community platform is avoided.

In the content publishing method provided in some embodiments, a plurality of different AI models are provided for an audio material, and for the audio material, the fun level of content is increased, thereby further avoiding the problem that excessively unvaried content is published on the online community platform.

Figure 10:
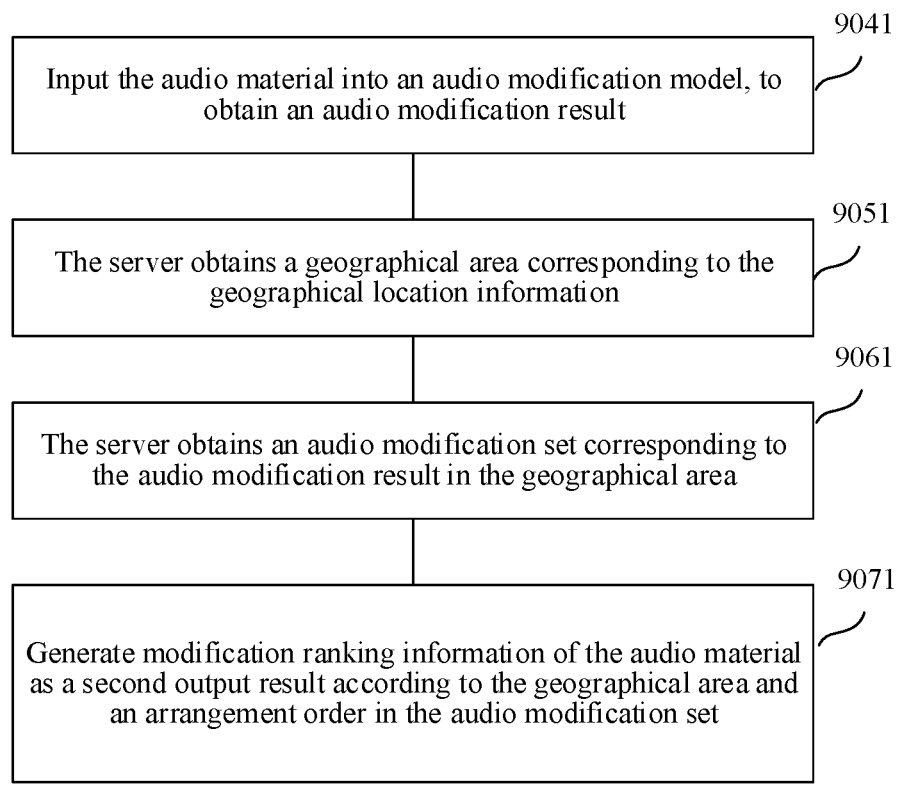
FIG. 10 is a flowchart of the content publishing method according to the embodiment shown in FIG. 9.

In an optional embodiment, the sound processing model is an audio modification model. As shown in FIG. 10, step 9041 to step 9071 may be implemented in place of step 904 to step 907.

Step 9041. Input the audio material into an audio modification model, to obtain an audio modification result.

Optionally, the audio modification model is formed by one or more neural networks, and the audio modification model may further be classified into a plurality of different audio modification models. Each audio modification model is used for modifying the audio material into a corresponding sound effect. For example, an audio modification model "transformers" is used for modifying a sound material into a sound effect of a transformer, and an audio modification model "little girl" is used for modifying a sound material into the sound effect of a little girl.

Optionally, the server modifies the audio material by using the audio modification model, and may further calculate a score of the audio modification result. The score may be obtained by calculating a similarity between the audio modification result and a standard audio corresponding to the audio modification model. For example, after the audio modification model "transformers" modifies the sound material into the sound effect of a transformer, the server further stores a line audio of transformers in the movie Transformers, and calculates an audio similarity between the audio modification result and the line audio, to obtain a score of the audio modification result.

Step 9051. The server obtains a geographical area corresponding to the geographical location information.

Step 9061. The server obtains an audio modification set corresponding to the audio modification result in the geographical area.

Optionally, the audio modification set includes a modification result of at least another audio material. The another audio material is uploaded by a terminal located in the geographical area.

Optionally, audio materials in the audio modification set may be sorted in descending order of scores of modification results.

For example, a corresponding audio modification set after audio materials uploaded by a terminal in Nanshan district are modified by using the audio modification model "transformers" is shown in the following Table 3:

TABLE 3

| Audio material | Modified by using an audio modification model "transformers" |
|---|---|
| Audio material a | 89 |
| Audio material b | 88 |
| Audio material c | 70 |
| Audio material d | 30 |

Step 9071. Generate modification ranking information of the audio material as a second output result according to the geographical area and an arrangement order in the audio modification set.

Optionally, the server may splice the name of the geographical area, an arrangement order of an audio modification result in the audio modification set, and the name of the audio modification model, to obtain modification ranking information.

For example, with reference to Table 3, an example in which the audio modification result is a modification result of the audio material b is used. A score of the audio modification result is 88 and ranks second in the audio modification set, so that modification ranking information of the audio material b is "Second transformer in Nanshan district".

In conclusion, in the content publishing method provided in some embodiments, an audio modification result is obtained by inputting an audio material into an audio modification model, and a second output result is obtained by combining the audio modification result with geographical location information, thereby increasing the fun level of content and further avoiding a problem that excessively unvaried content is published on an online community platform.

Figure 11:
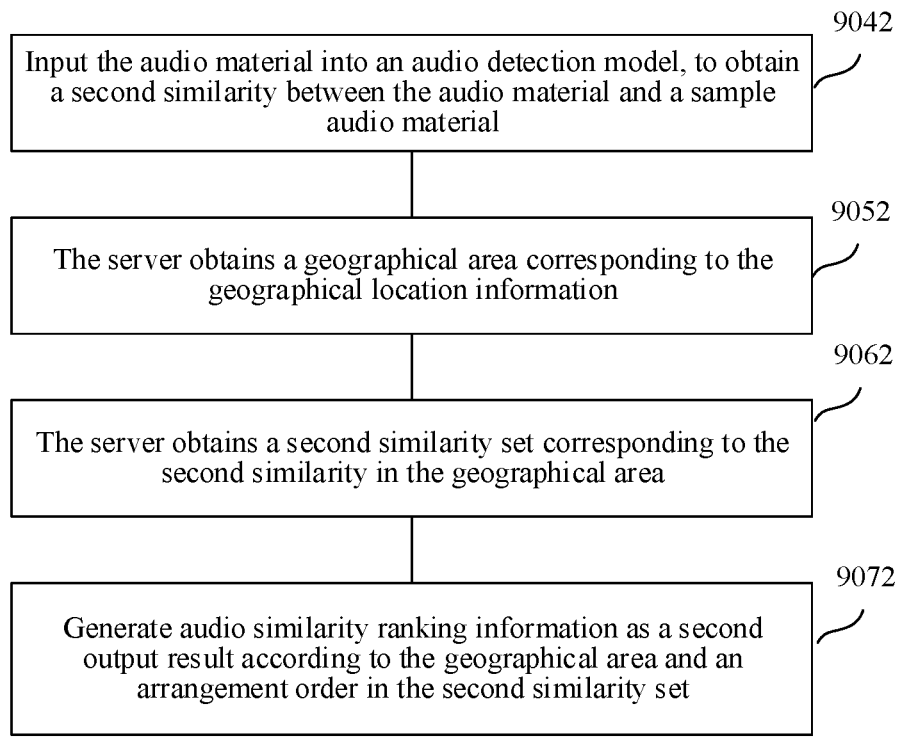
FIG. 11 is another flowchart of the content publishing method according to the embodiment shown in FIG. 9.

In an optional embodiment, the sound processing model is an audio detection model. As shown in FIG. 11, step 9042 to step 9072 may be implemented in place of step 904 to step 907.

Step 9042. Input the audio material into an audio detection model, to obtain a second similarity between the audio material and a sample audio material.

The audio detection model is used for calculating the second similarity between the audio material and the sample audio material.

Optionally, the server may input the audio material and a sample audio material into an audio detection model. The audio detection model may be formed by one or more neural networks. Features of the audio material and the sample audio material are extracted and matched by using the one or more neural networks, to obtain a second similarity between the audio material and the sample audio material.

The first output result includes the second similarity between the audio material and the sample audio material. Optionally, the sample audio material is one or more of audio materials that are pre-stored in the server. That is, the first output result may include more than one second similarity. Optionally, the sample audio material may be a fairly famous audio, for example, an audio material of a singer, an audio material of a movie character, or an audio material of a cartoon character.

For example, the first output result obtained for the audio material includes: a second similarity between the audio material and a sample audio material A being 78%, and a second similarity between the audio material and a sample audio material B being 55%. Optionally, the server may further arrange second similarities between the audio material and sample audio materials in descending order.

Step 9052. The server obtains a geographical area corresponding to the geographical location information.

Step 9062. The server obtains a second similarity set corresponding to the second similarity in the geographical area.

Optionally, the second similarity set includes a similarity between at least another audio material and the sample audio material. The another audio material is uploaded by a terminal located in the geographical area.

Optionally, audio materials in the second similarity set may be sorted in descending order of the second similarities.

For example, a second similarity set between audio materials uploaded by a terminal located in Nanshan district and a sample audio material "little girl" is shown in the following Table 4:

TABLE 4

| Audio material | Second similarity with "little girl" |
|---|---|
| Audio material a | 89% |
| Audio material b | 88% |
| Audio material c | 75% |
| Audio material d | 50% |

Step 9072. Generate audio similarity ranking information as a second output result according to the geographical area and an arrangement order in the second similarity set.

Optionally, the server may splice the name of the geographical area, a ranking of a second similarity in the second similarity set, and the name of the sample audio material, to obtain audio similarity ranking information.

For example, with reference to Table 4, an example in which the second similarity is a similarity between the audio material b and the sample audio material "little girl" is used. The second similarity is 88% and ranks second in the second similarity set, so that audio similarity ranking information of the audio material b is "Second little girl in Nanshan district".

In conclusion, in the content publishing method provided in some embodiments, a second similarity is obtained by inputting an audio material into an audio detection model, and a second output result is obtained by combining the second similarity with geographical location information, thereby increasing the fun level of content and further avoiding the problem that excessively unvaried content is published on an online community platform.

Figure 12:
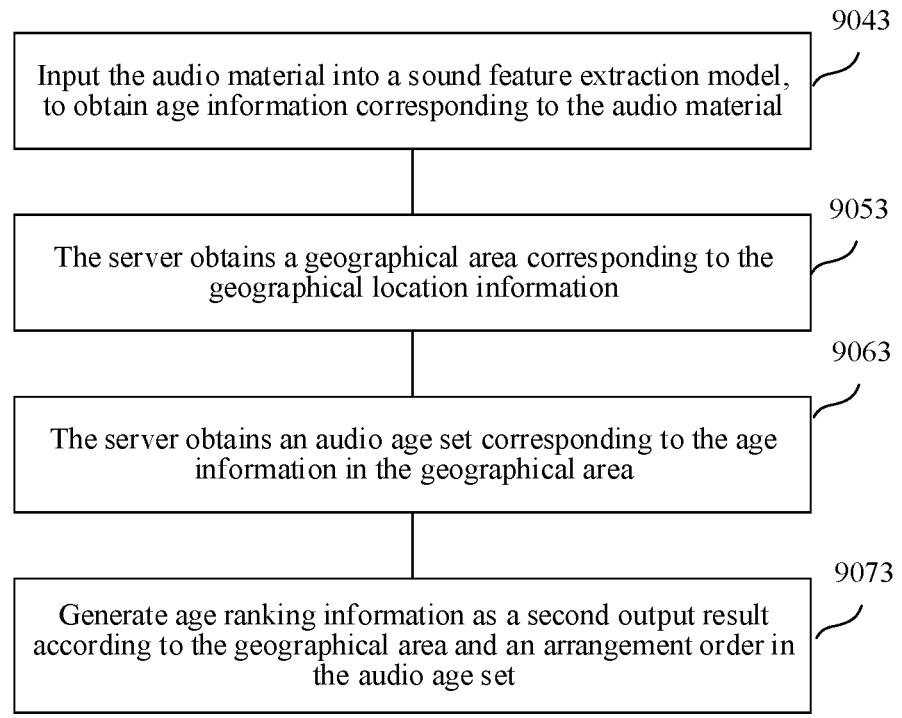
FIG. 12 is another flowchart of the content publishing method according to the embodiment shown in FIG. 9.

In an optional embodiment, the sound processing model is a sound feature extraction model. As shown in FIG. 12, step 9043 to step 9073 may be implemented in place of step 904 to step 907.

Step 9043. Input the audio material into a sound feature extraction model, to obtain age information corresponding to the audio material.

The sound feature extraction model is used for extracting a feature of the audio material.

Optionally, the server may input the audio material into a sound feature extraction model. The sound feature extraction model may be formed by one or more neural networks. A feature of the audio material is extracted by using the one or more neural networks, to obtain age information corresponding to the audio material.

Optionally, features such as sound intensity, sound legibility, and a sound softness of the audio material may further be obtained through feature extraction.

Step 9053. The server obtains a geographical area corresponding to the geographical location information.

Step 9063. The server obtains an audio age set corresponding to the age information in the geographical area.

Optionally, the audio age set includes age information corresponding to an audio of at least another audio material. The another audio material is uploaded by a terminal located in the geographical area.

Optionally, audio materials in the audio age set may be sorted in descending order of age information.

For example, an audio age set corresponding to age information of audio materials that are uploaded by a terminal in Nanshan district is shown in the following Table 5:

TABLE 5

| Audio material | Audio age information |
|---|---|
| Audio material a | 12 |
| Audio material b | 14 |
| Audio material c | 24 |
| Audio material d | 50 |

Step 9073. Generate age ranking information as a second output result according to the geographical area and an arrangement order of age information corresponding to an audio material in the audio age set.

Optionally, the server may splice the name of the geographical area, an arrangement order of age information corresponding to an audio material in the audio age set, and gender information of the audio material, to obtain age ranking information.

For example, with reference to Table 5, an example in which the age information corresponding to the audio material is age information corresponding to the audio material b is used. The age information is 14 and ranks second in the audio age set, so that age ranking information of the audio material b is "Second youngest girl in Nanshan district".

In conclusion, in the content publishing method provided in some embodiments, age information corresponding to an audio material is obtained by inputting the audio material into a sound feature extraction model, and a second output result is obtained by combining the age information with geographical location information, thereby increasing the fun level of content and further avoiding a problem that excessively unvaried content is published on an online community platform.

For the content publishing methods shown in FIG. 10 to FIG. 12, three solutions may be simultaneously implemented or may be implemented in a combination of any two or may be independently implemented as one independent solution. This is not limited in this embodiment of the present disclosure.

Figure 13:
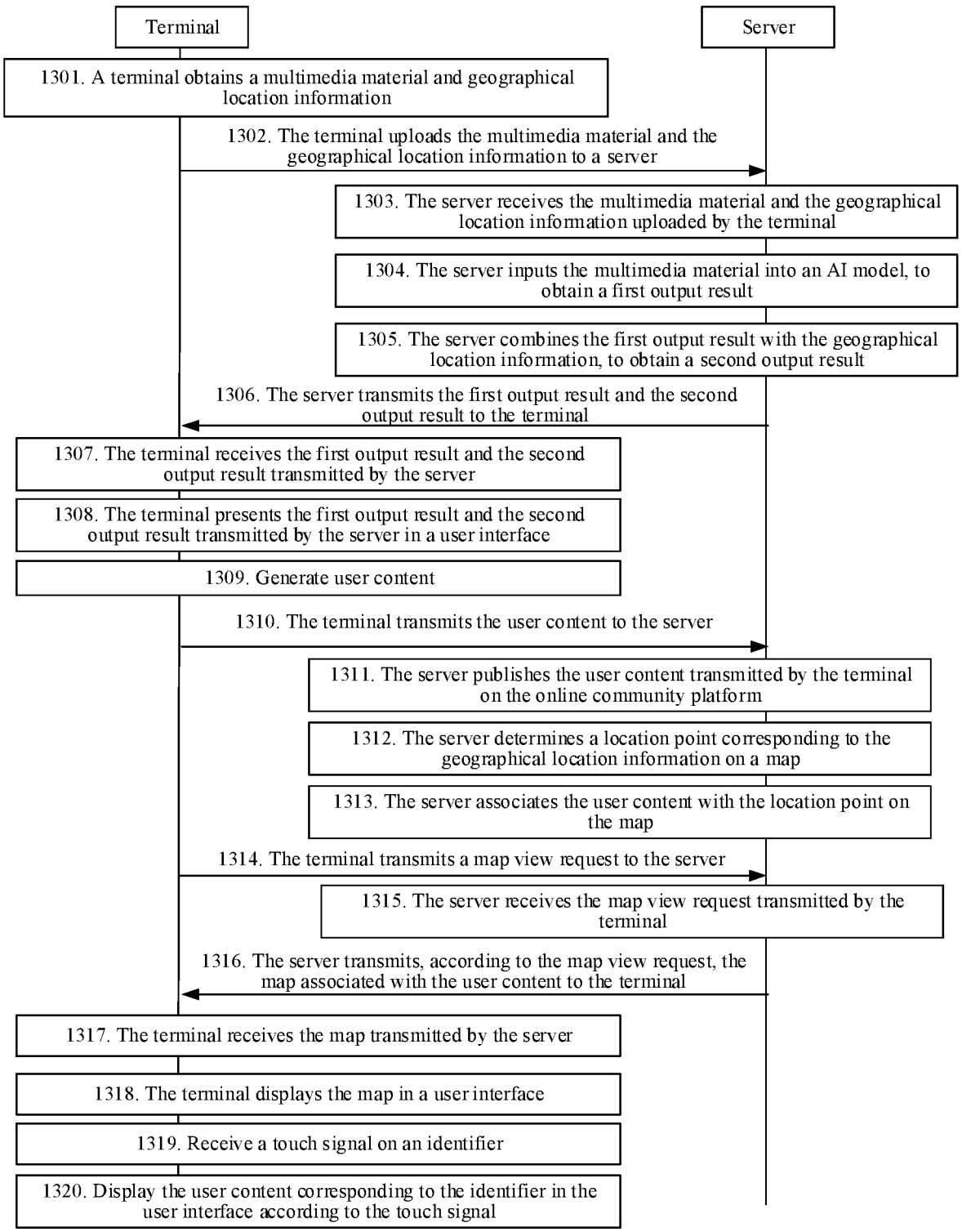
FIG. 13 is a flowchart of a content publishing method according to another exemplary embodiment of the present disclosure.

In an optional embodiment, the terminal may further view a map displaying an identifier of content. FIG. 13 is a flowchart of a content publishing method according to another exemplary embodiment of the present disclosure. An example in which the method is applied to the implementation environment shown in FIG. 1 is used for description. The content publishing method includes the following steps:

Step 1301. A terminal obtains a multimedia material and geographical location information.

Optionally, the multimedia material is a material obtained by the terminal through editing, download, or recording. For example, the terminal may edit a text as the multimedia material or upload an image as the multimedia material or record an audio as the multimedia material. Optionally, the multimedia material includes at least one of an image material, an audio material, a text material, or a video material.

Optionally, the geographical location information is information obtained by the terminal in a satellite positioning manner, and may be information obtained by the terminal in a mobile base station positioning manner, information obtained by the terminal in a wireless network assisted positioning manner, or information obtained by the terminal by using an AGPS. This is not limited in this embodiment of the present disclosure.

Step 1302. The terminal uploads the multimedia material and the geographical location information to a server.

Optionally, when the multimedia material is an image material, a user may select an image material that the user wants to upload from a local album of the terminal, and tap an upload control to upload the image material. The user may alternatively photograph an image material by using a camera of the terminal, and tap the upload control to upload the image material after the image material is obtained through photographing. When the multimedia material is an audio material, the user may select an audio material that the user wants to upload from a local recording library of the terminal, and tap the upload control to upload the audio material. The user may alternatively record an audio material by using a microphone of the terminal, and tap the upload control to upload the audio material after the audio material is obtained through recording.

Step 1303. The server receives the multimedia material and the geographical location information uploaded by the terminal.

Step 1304. The server inputs the multimedia material into an AI model, to obtain a first output result.

Optionally, the server inputs the received multimedia material into the AI model, to obtain the first output result. The first output result may be an image recognition result obtained after image recognition is performed on the image material, a modification result obtained after the audio material is modified.

Step 1305. The server combines the first output result with the geographical location information, to obtain a second output result.

Optionally, a manner of combining the first output result with the geographical location information includes at least one of the following manners: 1. Content corresponding to the first output result is displayed at a location point corresponding to the geographical location information on a map. 2. A geographical area corresponding to the geographical location information is obtained, and a same-type output result set corresponding to the first output result in the geographical area is obtained. Optionally, the same-type output result set includes at least one output result outputted by using an AI model. Optionally, the same-type output result set includes a plurality of output results outputted by using one same AI model.

Step 1306. The server transmits the first output result and the second output result to the terminal.

Step 1307. The terminal receives the first output result and the second output result transmitted by the server.

Optionally, the first output result is obtained after the server inputs the multimedia material into the AI model, and the second output result is obtained by the server by combining the first output result with the geographical location information.

Step 1308. The terminal presents the first output result and the second output result transmitted by the server in a user interface.

Optionally, the terminal may present the first output result and the second output result transmitted by the server in an edit user interface. The edit user interface includes a text edit box, the first output result, the second output result, and a post control. A user may edit a text in the text edit box. The terminal may further present the first output result and the second output result transmitted by the server in a presentation user interface. The presentation user interface includes the first output result, the second output result, and a share control.

Step 1309. Generate user content.

Optionally, the user content includes the first output result and the second output result. Optionally, the user content is used for being published on an online community platform.

Step 1310. The terminal transmits the user content to the server.

Step 1311. The server publishes the user content transmitted by the terminal on the online community platform.

Optionally, after the server publishes the user content on the online community platform, the terminal or other terminals may view the user content on the online community platform.

Step 1312. The server determines a location point corresponding to the geographical location information on a map.

Optionally, each piece of geographical location information corresponds to one location point on a map. After obtaining the geographical location information of the terminal, the server determines a location point corresponding to the geographical location information on the map.

Step 1313. The server associates the user content with the location point on the map.

Optionally, the user content is associated with the location point on the map, that is, when the map is viewed by using a target terminal, the user content is viewed at the location point, or an identifier of the user content is viewed. The identifier of the user content is a cursor displayed in a hover box on the map. Content displayed at the cursor includes at least one of an avatar of a user, a nickname of the user, and an identity (ID) number of the user. For example, an avatar of a user posting the content is displayed on the map.

Step 1314. The terminal transmits a map view request to the server.

The terminal includes the foregoing terminal, that is, the terminal publishing the content, and/or other terminals.

The map view request is used for requesting to view a map associated with the user content.

Step 1315. The server receives the map view request transmitted by the terminal.

Step 1316. The server transmits, according to the map view request, the map associated with the user content to the terminal.

Step 1317. The terminal receives the map transmitted by the server.

Step 1318. Display the map in a user interface.

Optionally, after receiving the map that is associated with the user content and is transmitted by the server, the terminal displays the map in a user interface. An identifier of the user content, for example, an avatar of a user posting the user content, is displayed on the map. For example, refer to FIG. 14 for a presentation result. The terminal displays, at a location point 1402, the avatar of the user posting the content in a user interface 1401, where the user interface 1401 includes the foregoing map, and displays, at another location point, an avatar of a user posting other content. That is, the avatar of the user is presented in a geographic location of the content on the map.

Step 1319. Receive a touch signal on the identifier.

Step 1320. Display the user content corresponding to the identifier in the user interface according to the touch signal.

Optionally, after receiving the touch signal on the identifier, the terminal displays the user content corresponding to the identifier in the user interface according to the touch signal. Optionally, after receiving the touch signal on the identifier, the terminal obtains content corresponding to the identifier from the server, and displays the content in the user interface. Alternatively, after receiving the touch signal on the identifier, the terminal obtains content corresponding to the identifier from cached content, and displays the content in the user interface. For example, after a user taps the avatar of the foregoing user in the user interface, specific content of the content published by the user corresponding to the avatar may be displayed.

Figure 14:
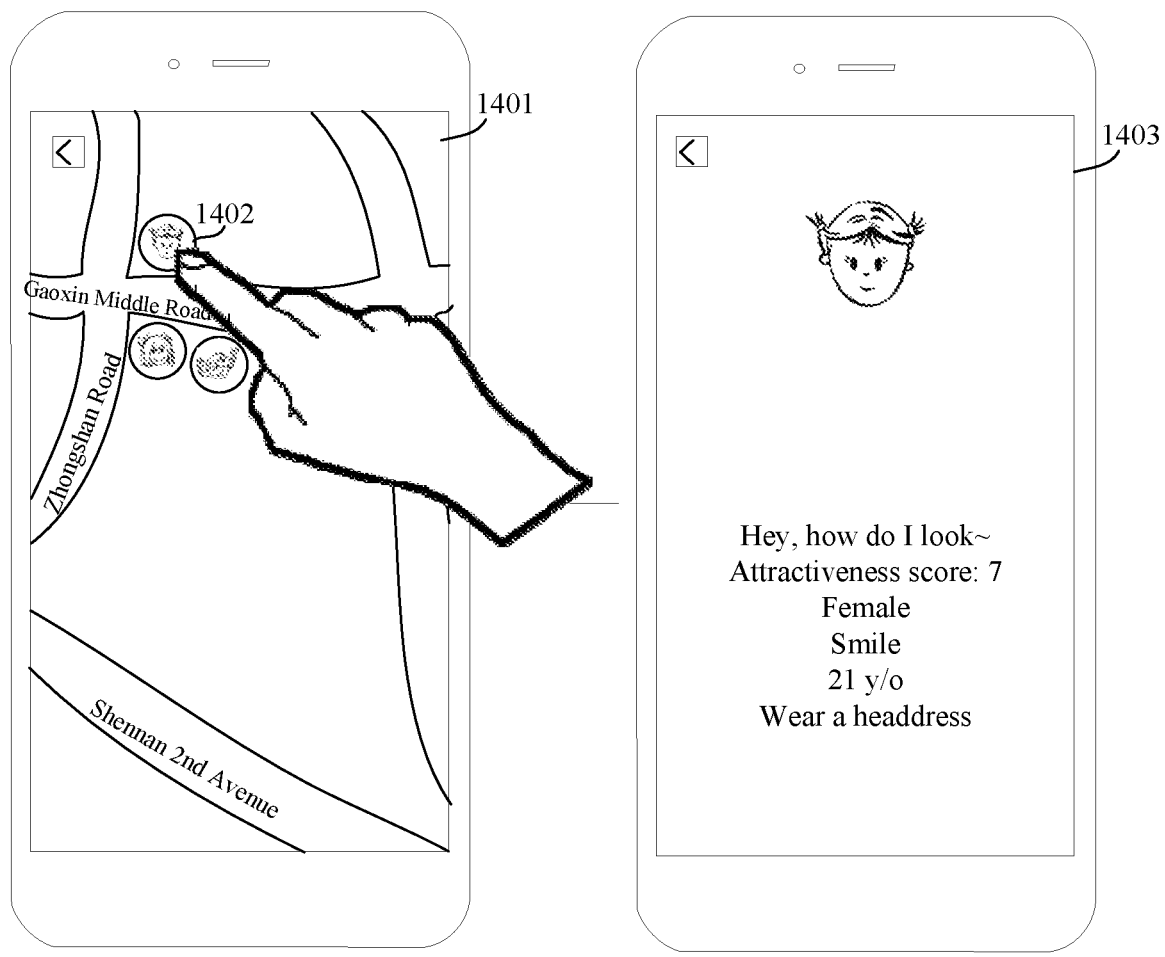
FIG. 14 is a schematic diagram of a user interface of a terminal according to another exemplary embodiment of the present disclosure.

For example, with reference to FIG. 14, after a user taps an avatar of the location point 1402 in the user interface 1401, a user interface 1403 is displayed on the terminal, and content posted by a user corresponding to the avatar of the location point 1402 is displayed in the user interface 1403.

Step 1314 to step 1320 may be performed after step 1313 or may be performed at any moment before step 1313. A performing sequence of step 1314 to step 1320 is not limited in this embodiment of the present disclosure.

The content publishing method provided in FIG. 13 may be implemented by combining any content publishing method shown in FIG. 1 to FIG. 12 or may be independently implemented as an independent solution.

In conclusion, in the content publishing method provided in some embodiments, a first output result is obtained by inputting a multimedia material into an AI model, a second output result is obtained by combining the first output result with geographical location information, and content is generated according to the first output result and the second output result and is posted on an online community platform, so that a user publishes UGC on the online community platform in more varied forms, and the interactivity of the online community platform is improved. Moreover, the tonality of the online community platform is improved. That is, a requirement that content published by the user in a circle on the online community platform better satisfies a corresponding topic in this circle is satisfied, and a problem that excessively unvaried content is published on the online community platform is avoided.

In the content publishing method provided in some embodiments, an identifier of content such as an avatar of a user is displayed on a map, so that a target terminal may select an avatar of a user on the map view to view content posted by the user at a geographic location on the map, thereby increasing the fun level of content published on an online community platform and further increasing interactivity between users on the online community platform.

In the content publishing method shown in FIG. 1 to FIG. 13, an example in which the user content includes the first output result and the second output result is used for description. In an actual operation, the user content may alternatively merely include the first output result, or merely include the second output result, or include the first output result and other content added by a user, or include the second output result and other content added by a user. Specific content included in the user content is determined by user content that the user eventually selects to publish.

Figure 15:
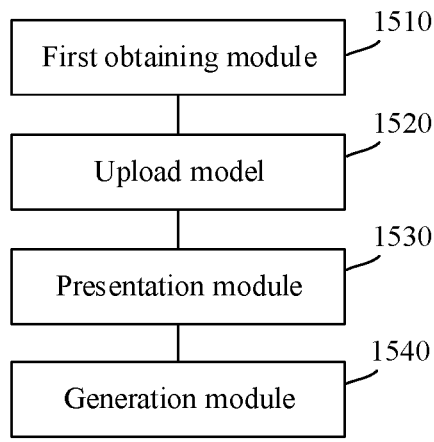
FIG. 15 is a structural block diagram of a content publishing apparatus according to an exemplary embodiment of the present disclosure.

FIG. 15 is a structural block diagram of a content publishing apparatus according to an exemplary embodiment of the present disclosure. As shown in FIG. 15, the content publishing apparatus includes: a first obtaining module 1510, an upload model 1520, a presentation module 1530, and a generation module 1540.

The first obtaining module 1510 is configured to obtain a multimedia material and geographical location information.

The upload model 1520 is configured to upload the multimedia material and the geographical location information to a server.

The presentation module 1530 is configured to present a first output result and a second output result transmitted by the server in a user interface, the first output result being obtained after the server inputs the multimedia material into an AI model, and the second output result being obtained by the server by combining the first output result with the geographical location information.

The generation module 1540 is configured to generate user content, the user content including the first output result and the second output result.

In an optional embodiment, the second output result includes ranking information of the first output result in a geographical area, where the ranking information is determined according to an arrangement order in an output result set, the output result set corresponding to a type of the first output result in the geographical area being determined after the server obtains the geographical area corresponding to the geographical location information, and the output result set including at least one output result obtained after another multimedia material is inputted into the AI model.

In an optional embodiment, the multimedia material is an image material, and the image material includes a face area; and the first output result is obtained after the server inputs the face area in the image material into a face processing model, where the face processing model is used for performing at least one of face similarity detection and face feature analysis on the face area.

In an optional embodiment, the first output result includes a first similarity between the face area and a sample face; and the second output result includes face similarity ranking information, where the face similarity ranking information is determined according to an arrangement order in a first similarity set, the first similarity set of the geographical area being obtained after the server obtains the geographical area corresponding to the geographical location information, and the first similarity set including a similarity between at least another face area and the sample face.

In an optional embodiment, the first output result includes a charm value, the charm value being obtained by the server by inputting the face area into a face analysis model; and the second output result includes face charm value ranking information, where the face charm value ranking information is determined according to an arrangement order of a face charm value set, the face charm value set of the geographical area being obtained after the server obtains the geographical area corresponding to the geographical location information, and the face charm value set including a charm value of at least another face area.

In an optional embodiment, the multimedia material is an audio material; and the first output result is obtained after the server inputs the audio material into a sound processing model, where the sound processing model is used for performing at least one of modification, sound feature extraction, and sound similarity detection on the audio material.

In an optional embodiment, the first output result includes an audio modification result, the audio modification result being obtained after the server inputs the audio material into an audio modification model; and the second output result includes modification ranking information, where the modification ranking information is determined according to an arrangement order in an audio modification set, the audio modification set of the geographical area being obtained after the server obtains the geographical area corresponding to the geographical location information, and the audio modification set including at least one modification result of another audio material.

In an optional embodiment, the first output result includes age information corresponding to the audio material, the age information corresponding to the audio material being obtained after the server inputs the audio material into a sound feature extraction model; and the second output result includes age ranking information, where the age ranking information is determined according to an arrangement order in an audio age set, the audio age set of the geographical area being obtained after the server obtains the geographical area corresponding to the geographical location information, and the audio age set including age information corresponding to an audio of at least another audio material.

In an optional embodiment, the first output result includes a second similarity between the audio material and a sample audio material, the second similarity being obtained after the server inputs the audio material into an audio detection model; and the second output result includes audio similarity ranking information, where the audio similarity ranking information is determined according to an arrangement order in a second similarity set, the second similarity set of the geographical area being obtained after the server obtains the geographical area corresponding to the geographical location information, and the second similarity set including a similarity between at least another audio material and the sample audio material.

Figure 16:
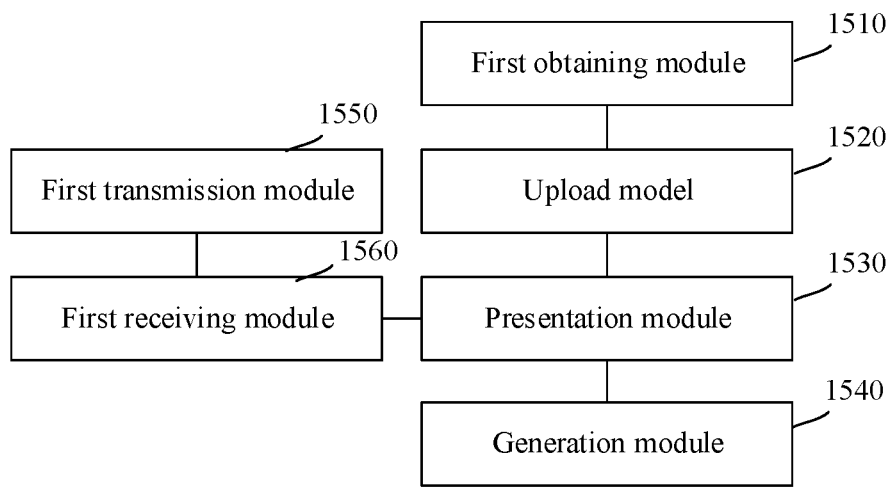
FIG. 16 is a structural block diagram of a content publishing apparatus according to another exemplary embodiment of the present disclosure.

In an optional embodiment, as shown in FIG. 16, the apparatus further includes:

a first transmission module 1550, configured to transmit a sound processing option to the server, where the sound processing option is used for instructing the server to input the audio material into the sound processing model corresponding to the sound processing option.

In an optional embodiment, the first transmission module 1550 is further configured to transmit a map view request to the server, where the map view request is used for requesting to view a map associated with the user content.

The apparatus further includes:

a first receiving module 1560, configured to receive the map transmitted by the server, a presentation module 1530 being further configured to display the map in the user interface, where an identifier of the user content is displayed at a location point corresponding to the geographical location information on the map.

In an optional embodiment, the first receiving module is further configured to receive a touch signal on the identifier, the presentation module 1530 being further configured to display the user content corresponding to the identifier in the user interface according to the touch signal.

Figure 17:
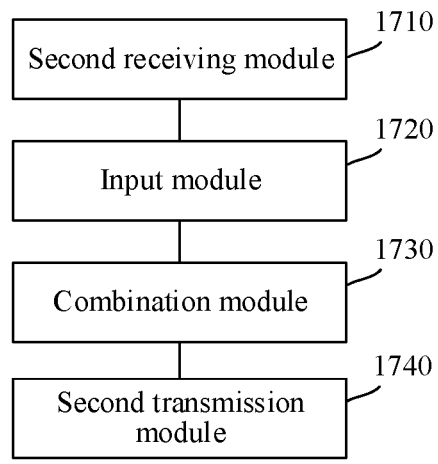
FIG. 17 is a structural block diagram of a content publishing apparatus according to another exemplary embodiment of the present disclosure.

FIG. 17 is a structural block diagram of a content publishing apparatus according to another exemplary embodiment of the present disclosure. As shown in FIG. 17, the content publishing apparatus includes: a second receiving module 1710, an input module 1720, a combination module 1730, and a second transmission module 1740.

The second receiving module 1710 is configured to receive a multimedia material and geographical location information uploaded by a terminal.

The input module 1720 is configured to input the multimedia material into an AI model, to obtain a first output result.

The combination module 1730 is configured to combine the first output result with the geographical location information, to obtain a second output result.

The second transmission module 1740 is configured to transmit the first output result and the second output result to the terminal.

The second receiving module 1710 is further configured to receive user content transmitted by the terminal through an online community platform, the user content including the first output result and the second output result.

Figure 18:
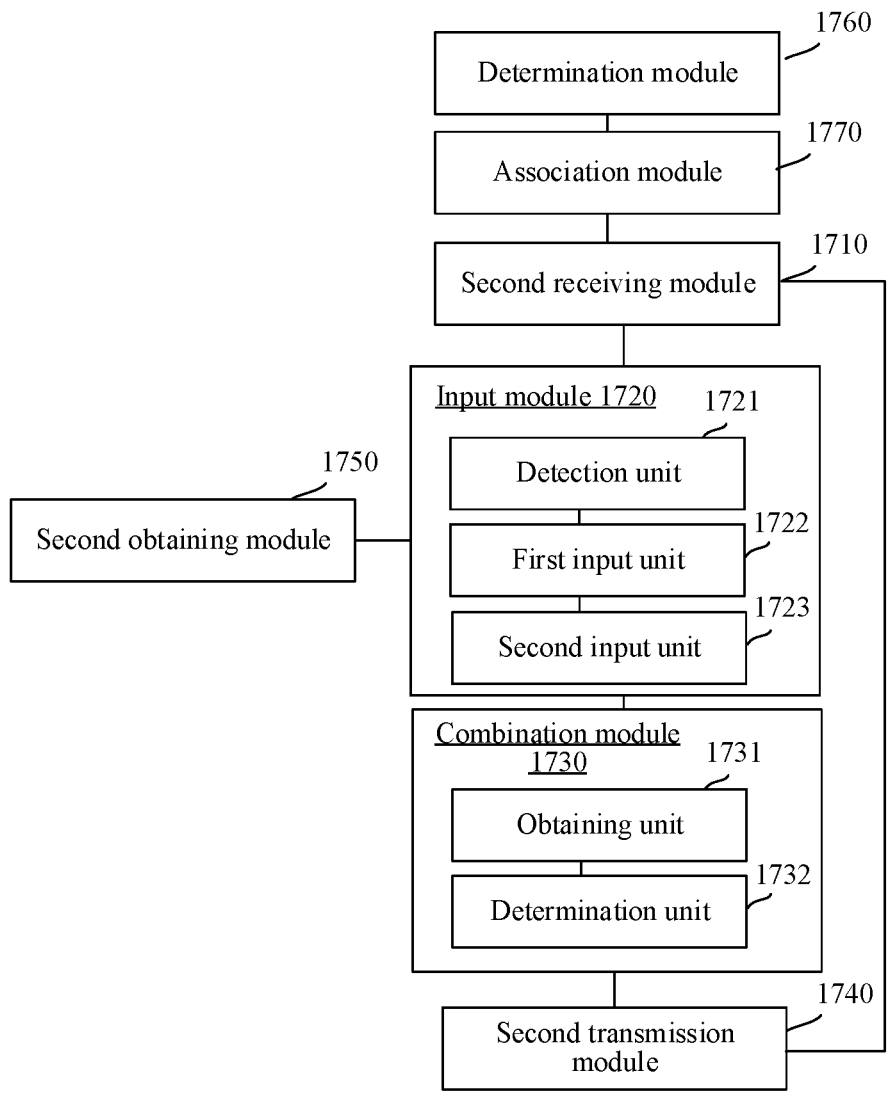
FIG. 18 is a structural block diagram of a content publishing apparatus according to another exemplary embodiment of the present disclosure.

In an optional embodiment, as shown in FIG. 18, the combination module 1730 includes:

an obtaining unit 1731, configured to obtain a geographical area corresponding to the geographical location information, the obtaining unit 1731 being further configured to obtain an output result set corresponding to a type of the first output result in the geographical area, the output result set including at least one output result obtained after another multimedia material is inputted into the AI model; and a determination unit 1732, configured to determine a second output result according to an arrangement order in the output result set.

In an optional embodiment, the multimedia material is an image material.

The input module 1720 includes:

a detection unit 1721, configured to detect whether the image material includes a face area; and a first input unit 1722, configured to input the face area into a face processing model when the image material includes the face area, to obtain a first output result, the face processing model being used for performing at least one of face similarity detection and face feature analysis on the face area.

In an optional embodiment, the first input unit 1722 is further configured to input the face area into a face matching model when the image material includes the face area, to obtain the first output result, the first output result including a first similarity between the face area and a sample face.

In an optional embodiment, the same-type output result set includes a first similarity set, the first similarity set including a similarity between at least another face area and the sample face, and the another face area being uploaded by a terminal located in the geographical area, the determination unit 1732 being further configured to generate similarity ranking information of the face area as a second output result according to the geographical area and an arrangement order in the first similarity set.

In an optional embodiment, the first input unit 1722 is further configured to input the face area into a face analysis model when the image material includes the face area, to obtain the first output result, the first output result including a face charm value.

In an optional embodiment, the same-type output result set includes a face charm value set.

The face charm value set includes a charm value of at least another face area. The another face area is uploaded by a terminal located in the geographical area.

The determination unit 1732 is configured to generate face charm value ranking information of the face area as a second output result according to the geographical area and an arrangement order in the face charm value set.

In an optional embodiment, the multimedia material includes an audio material.

The input module 1720 includes:

a second input unit 1723, configured to input the audio material into a sound processing model, to obtain a first output result, where the sound processing model is used for performing at least one of modification, sound feature extraction, and sound similarity detection on the audio material.

In an optional embodiment, the first output result includes an audio modification result.

The second input unit 1723 is further configured to input the audio material into an audio modification model, to obtain the audio modification result.

In an optional embodiment, the same-type output result set includes an audio modification set, the audio modification set including a modification result of at least another audio material, and the another audio material being uploaded by a terminal located in the geographical area; and the determination unit 1732 being further configured to generate modification ranking information of the audio material as a second output result according to the geographical area and an arrangement order in the audio modification set.

In an optional embodiment, the first output result includes an audio similarity between the audio material and a sample audio material.

The second input unit 1723 is further configured to input the audio material into an audio detection model, to obtain a second similarity between the audio material and a sample audio material.

In an optional embodiment, the same-type output result set includes a second similarity set, the second similarity set including a similarity between at least another audio material and the sample audio material, and the another audio material being uploaded by a terminal located in the geographical area; and the determination unit 1732 being further configured to generate audio similarity ranking information as a second output result according to the geographical area and an arrangement order in the second similarity set.

In an optional embodiment, the first output result includes age information corresponding to the audio material.

The second input unit 1723 is further configured to input the audio material into a sound feature extraction model, to obtain age information corresponding to the audio material.

In an optional embodiment, the same-type output result set includes an audio age set, the audio age set including age information corresponding to an audio of at least another audio material, and the another audio material being uploaded by a terminal located in the geographical area; and the determination unit 1732 being further configured to generate age ranking information as a second output result according to the geographical area and an arrangement order in the audio age set.

In an optional embodiment, the second receiving module 1710 is further configured to receive a sound processing option transmitted by the terminal through an online community platform.

The apparatus further includes:

a second obtaining module 1750, configured to obtain the sound processing model corresponding to the sound processing option.

In an optional embodiment, the apparatus further includes:

a determination module 1760, configured to determine a location point corresponding to the geographical location information on a map; and an association module 1770, configured to associate the user content with the location point on the map, the second receiving module 1710 being further configured to receive a map view request transmitted by a target terminal by using an online community platform; and the second transmission module 1740 being further configured to transmit, according to the map view request, the map associated with the user content to the target terminal by using the online community platform, the target terminal including the terminal and/or other terminals.

Figure 19:
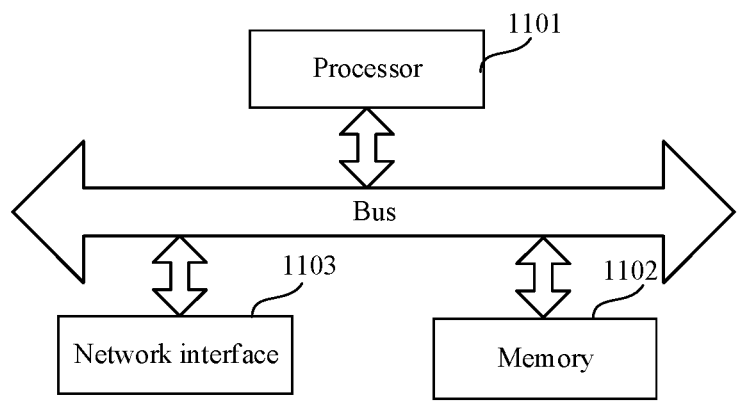
FIG. 19 is a structural block diagram of a computer device according to an exemplary embodiment of the present disclosure.

FIG. 19 is a structural block diagram of a computer device according to an exemplary embodiment of the present disclosure. The computer device includes: a processor 1101, a memory 1102, and a network interface 1103.

The network interface 1103 is connected to the processor 1101 by using a bus or in another manner, and is configured to receive an input image or a sample image.

The processor 1101 may be a central processing unit (CPU), a network processor (NP), or a combination of the CPU and the NP. The processor 1101 may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof. There may be one or more processors 1101.

The memory 1102 is connected to the processor 1101 by using a bus or in another manner. The memory 1102 stores one or more programs, the one or more programs being executed by the processor 1101 and including an instruction for performing operations of the content publishing methods in embodiments in FIG. 2, FIG. 3, FIG. 4, and FIG. 7 to FIG. 13. The memory 1102 may be a volatile memory, a non-volatile memory, or a combination thereof. The volatile memory may be a random access memory (RAM), for example, a static random access memory (SRAM) or a dynamic random access memory (DRAM). The non-volatile memory may be a read-only memory (ROM), for example, a programmable read-only memory (PROM), an erasable programmable read-only memory (EPROM), or an electrically erasable programmable read-only memory (EEPROM). The non-volatile memory may alternatively be a flash memory or a magnetic memory, for example, a magnetic tape, a floppy disk, or a hard disk. The non-volatile memory may alternatively be an optical disc.

Optionally, the computer device may be a terminal, or may be a server.

An embodiment of the present disclosure further provides a computer-readable storage medium, the storage medium storing at least one instruction, at least one program, and a code set or an instruction set, and the at least one instruction, the at least one program, and the code set or the instruction set being loaded and executed by the processor 1101 to implement the content publishing method in any one of FIG. 2, FIG. 3, FIG. 4, and FIG. 7 to FIG. 13.

The present disclosure further provides a computer program product, and the computer program product, when run on a computer, causes the computer to perform the content publishing method according to the foregoing method embodiments.

A person of ordinary skill in the art may understand that all or a part of the steps of the methods in the embodiments may be implemented by a program instructing relevant hardware. The program may be stored in a computer-readable storage medium. The computer-readable storage medium may be the computer-readable storage medium included in the memory in the foregoing embodiment, or may be a computer-readable storage medium that exists independently and that is not assembled in a terminal. The computer-readable storage medium stores at least one instruction, at least one program, and a code set or an instruction set, and the at least one instruction, the at least one program, and the code set or the instruction set being loaded and executed by the processor to implement the content publishing method in any one of FIG. 1 to FIG. 13.

Optionally, the computer-readable storage medium may include: a read-only memory (ROM), a RAM, a solid state drive (SSD), an optical disc, or the like. The RAM may include a resistance random access memory (ReRAM) and a DRAM. The sequence numbers of the foregoing embodiments of the present disclosure are merely for the convenience of description, and do not imply the preference among the embodiments.

A person of ordinary skill in the art may understand that all or some of the steps of the embodiments may be implemented by hardware or a program instructing related hardware. The program may be stored in a computer-readable storage medium. The storage medium may be: a read-only memory, a magnetic disk, or an optical disc.

The foregoing descriptions are merely exemplary embodiments of the present disclosure, but are not intended to limit the present disclosure. Any modification, equivalent replacement, or improvement made within the spirit and principle of the present disclosure shall fall within the protection scope of the present disclosure.

What is claimed is:

1. A content publishing method, applied to a terminal, and comprising:
   obtaining a multimedia material and geographical location information;
   uploading the multimedia material and the geographical location information to a server;
   presenting a first output result and a second output result transmitted by the server in a user interface, the first output result being obtained after the server inputs the multimedia material into an artificial intelligence (AI) model, and the second output result being obtained by the server by combining the first output result with the geographical location information; and
   generating user content that comprises the first output result and the second output result.

2. The method according to claim 1, wherein:
   the second output result comprises ranking information of the first output result in a geographical area; and
   the ranking information is determined according to an arrangement order in an output result set corresponding to a type of the first output result in the geographical area, the output result set being determined after the server obtains the geographical area corresponding to the geographical location information, and comprising at least one output result obtained after another multimedia material is inputted into the AI model.

3. The method according to claim 2, wherein:
   the multimedia material includes an image, and the image comprises a face area; and
   the first output result is obtained after the server inputs the face area in the image into a face processing model for performing at least one of face similarity detection and face feature analysis on the face area.

4. The method according to claim 3, wherein:
   the first output result comprises a first similarity between the face area and a sample face; and
   the second output result comprises face similarity ranking information determined according to an arrangement order in a first similarity set of the geographical area the first similarity set being obtained after the server obtains the geographical area corresponding to the geographical location information, and comprising a similarity between at least another face area and the sample face.

5. The method according to claim 3, wherein:
   the first output result comprises a charm value, the charm value being obtained by the server by inputting the face area into a face analysis model; and
   the second output result comprises face charm value ranking information determined according to an arrangement order of a face charm value set of the geographical area, the face charm value set being obtained after the server obtains the geographical area corresponding to the geographical location information, and comprising a charm value of at least another face area.

6. The method according to claim 2, wherein:
   the multimedia material includes an audio; and
   the first output result is obtained after the server inputs the audio material into a sound processing model for performing at least one of modification, sound feature extraction, or sound similarity detection on the audio material.

7. The method according to claim 6, wherein:
   the first output result comprises an audio modification result obtained after the server inputs the audio material into an audio modification model; and
   the second output result comprises modification ranking information determined according to an arrangement order in an audio modification set of the geographical area, the audio modification set being obtained after the server obtains the geographical area corresponding to the geographical location information, and comprising at least one modification result of another audio material.

8. The method according to claim 6, wherein:
   the first output result comprises age information corresponding to the audio material obtained after the server inputs the audio material into a sound feature extraction model; and
   the second output result comprises age ranking information determined according to an arrangement order in an audio age set of the geographical area, the audio age set being obtained after the server obtains the geographical area corresponding to the geographical location information, and comprising age information corresponding to an audio of at least another audio material.

9. The method according to claim 6, wherein:
   the first output result comprises a second similarity between the audio material and a sample audio material, the second similarity being obtained after the server inputs the audio material into an audio detection model; and
   the second output result comprises audio similarity ranking information determined according to an arrangement order in a second similarity set of the geographical area, the second similarity set being obtained after the server obtains the geographical area corresponding to the geographical location information, and comprising a similarity between at least another audio material and the sample audio material.

10. The method according to claim 6, wherein before the presenting a first output result and a second output result transmitted by the server in a user interface, the method further comprises:
    transmitting a sound processing option to the server to instruct the server to input the audio material into the sound processing model corresponding to the sound processing option.

11. The method according to claim 1, wherein the method further comprises:
    transmitting a map viewing request to the server for requesting to view a map associated with the user content;
    receiving the map transmitted by the server; and
    displaying the map in the user interface, and displaying an identifier of the user content at a location point corresponding to the geographical location information on the map.

12. The method according to claim 11, wherein after the displaying the map in the user interface, the method further comprises:
    receiving a touch signal on the identifier; and
    displaying the user content corresponding to the identifier in the user interface according to the touch signal.

13. A content publishing apparatus, comprising:
one or more processors; and
a memory,
the memory storing one or more programs, the one or more programs being configured to be executed by the one or more processors and comprising an instruction for performing the following operations:
obtaining a multimedia material and geographical location information;
uploading the multimedia material and the geographical location information to a server;
presenting a first output result and a second output result transmitted by the server in a user interface, the first output result being obtained after the server inputs the multimedia material into an artificial intelligence (AI) model, and the second output result being obtained by the server by combining the first output result with the geographical location information; and
generating content that comprises the first output result and the second output result.

14. The apparatus according to claim 13, wherein:
the second output result comprises ranking information of the first output result in a geographical area; and
the ranking information is determined according to an arrangement order in an output result set corresponding to a type of the first output result in the geographical area, the output result set being determined after the server obtains the geographical area corresponding to the geographical location information, and comprising at least one output result obtained after another multimedia material is inputted into the AI model.

15. The apparatus according to claim 14, wherein:
the multimedia material includes an image, and the image comprises a face area; and
the first output result is obtained after the server inputs the face area in the image into a face processing model for performing at least one of face similarity detection and face feature analysis on the face area.

16. The apparatus according to claim 15, wherein:
the first output result comprises a first similarity between the face area and a sample face; and
the second output result comprises face similarity ranking information determined according to an arrangement order in a first similarity set of the geographical area the first similarity set being obtained after the server obtains the geographical area corresponding to the geographical location information, and comprising a similarity between at least another face area and the sample face.

17. The apparatus according to claim 15, wherein:
the first output result comprises a charm value, the charm value being obtained by the server by inputting the face area into a face analysis model; and
the second output result comprises face charm value ranking information determined according to an arrangement order of a face charm value set of the geographical area, the face charm value set being obtained after the server obtains the geographical area corresponding to the geographical location information, and comprising a charm value of at least another face area.

18. The apparatus according to claim 14, wherein:
the multimedia material includes an audio; and
the first output result is obtained after the server inputs the audio material into a sound processing model for performing at least one of modification, sound feature extraction, or sound similarity detection on the audio material.

19. The method according to claim 13, wherein the one or more programs further comprise an instruction for performing the following operations:
transmitting a map viewing request to the server for requesting to view a map related to the user content;
receiving the map transmitted by the server; and
displaying the map in the user interface, and displaying an identifier of the user content at a location point corresponding to the geographical location information on the map.

20. A non-transitory computer-readable storage medium, storing at least one instruction, at least one program, and a code set or an instruction set, and the at least one instruction, the at least one program, and the code set or the instruction set being loaded and executed by a processor to implement:
obtaining a multimedia material and geographical location information;
uploading the multimedia material and the geographical location information to a server;
presenting a first output result and a second output result transmitted by the server in a user interface, the first output result being obtained after the server inputs the multimedia material into an artificial intelligence (AI) model, and the second output result being obtained by the server by combining the first output result with the geographical location information; and
generating user content that comprises the first output result and the second output result.

* * * * *